US012670677B2

(12) United States Patent (10) Patent No.: US 12,670,677 B2
Lee et al. (45) Date of Patent: Jun. 30, 2026

(54) METHOD FOR PROVIDING VIRTUAL IMAGE CORRESPONDING TO DIGITAL ITEM, AND AUGMENTED REALITY DEVICE

(71) Applicant: Samsung Electronics Co., Ltd., Suwon-si (KR)

(72) Inventors: Joayoung Lee, Suwon-si (KR); Seokyoung Kang, Suwon-si (KR); Jinseon Yoo, Suwon-si (KR); Sungbin Kuk, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/982,350

(22) Filed: Dec. 16, 2024

(65) Prior Publication Data

US 2025/0118033 A1 Apr. 10, 2025

Related U.S. Application Data

(63) Continuation of application No. PCT/KR2023/010014, filed on Jul. 13, 2023.

(30) Foreign Application Priority Data

Aug. 25, 2022 (KR) ........................ 10-2022-0107161
Oct. 4, 2022 (KR) ........................ 10-2022-0126514

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/013* (2013.01); *G06T 11/00* (2013.01); *G06T 19/20* (2013.01);
(Continued)

(58) Field of Classification Search
CPC ...... G06F 3/011; G06F 3/013; G06F 3/04815; G06F 3/0482; G06F 21/30–46;
(Continued)

(56) References Cited

U.S. PATENT DOCUMENTS 9,607,418 B1 * 3/2017 Hemminger ............ G06T 11/60
10,863,168 B2 12/2020 Champion et al.
(Continued)

FOREIGN PATENT DOCUMENTS

JP 2014-186434 A 10/2014
JP 2019-144890 A 8/2019
(Continued)

OTHER PUBLICATIONS

International Search Report dated Oct. 13, 2023, issued in International Patent Application No. PCT/KR2023/010014.
(Continued)

*Primary Examiner* — Amr A Awad
*Assistant Examiner* — Aaron Midkiff
(74) *Attorney, Agent, or Firm* — Jefferson IP Law, LLP

(57) ABSTRACT

A method of providing a virtual image corresponding to a digital item is provided. The method includes generating the virtual image corresponding to the digital item owned by a user of an augmented reality device, obtaining mapping location information of a real world object to which the generated virtual image is to be mapped, mapping and rendering the virtual image based on the obtained mapping location information, and displaying the rendered virtual image on a display of the augmented reality device according to public setting information.

21 Claims, 17 Drawing Sheets

(51) Int. Cl.
| | | |
|---|---|---|
| *G06T 11/00* | (2006.01) | |
| *G06T 19/20* | (2011.01) | |
| *G06F 3/0482* | (2013.01) | |

(52) U.S. Cl.
CPC ........ *G06F 3/0482* (2013.01); *G06T 2200/24* (2013.01); *G06T 2219/2004* (2013.01)

(58) Field of Classification Search
CPC ......... G06F 2221/21; G06F 2221/2137; G06F 2221/2141; G06F 2221/2145; G06F 2221/2149; G06F 21/00–88; G06F 2221/00–2153; G06F 3/048; G06F 16/58–587; G06T 11/00; G06T 19/006; G06T 19/20; G06T 2200/24; G06T 2219/2004; G06T 2211/428; G06T 11/60; A63F 13/53; A63F 13/61; A63F 13/79; G06Q 30/018; G06Q 30/0209; G06Q 30/0276; G06Q 30/0277; G06Q 30/0621; G06Q 30/0643; G06Q 40/04; G06Q 40/055; G06Q 30/00–08; G06Q 20/10; A61B 3/113; A61B 5/163; G02B 27/0093; H04N 13/383; H04L 9/50
See application file for complete search history.

(56) References Cited

U.S. PATENT DOCUMENTS

| | | | |
|---|---|---|---|
| 2013/0050262 A1 | 2/2013 | Jeon | |
| 2014/0285521 A1* | 9/2014 | Kimura | ................ G02B 27/017 |
| | | | 345/633 |
| 2017/0168585 A1* | 6/2017 | Faaborg | .................. G06F 3/147 |
| 2017/0337741 A1 | 11/2017 | Fradet et al. | |
| 2018/0096528 A1 | 4/2018 | Needham et al. | |
| 2020/0051339 A1 | 2/2020 | Wei et al. | |
| 2020/0380594 A1 | 12/2020 | Ueda et al. | |
| 2021/0049817 A1 | 2/2021 | Lee et al. | |
| 2022/0101417 A1* | 3/2022 | Boscolo | ............. G06Q 30/0633 |
| 2022/0374969 A1* | 11/2022 | Berger | .............. G06Q 30/0641 |

FOREIGN PATENT DOCUMENTS

| | | |
|---|---|---|
| KR | 10-1016556 B1 | 2/2011 |
| KR | 10-2012-0011138 A | 2/2012 |
| KR | 10-2013-0112578 A | 10/2013 |
| KR | 10-2017-0131246 A | 11/2017 |
| KR | 10-2163378 B1 | 10/2020 |
| KR | 10-2021-0020432 A | 2/2021 |
| KR | 10-2259210 B1 | 6/2021 |
| KR | 10-2022-0048651 A | 4/2022 |
| WO | 2022/066570 A1 | 3/2022 |

OTHER PUBLICATIONS

Extended European Search Report dated Sep. 5, 2025, issued in a European Application No. 23857563.3.

* cited by examiner

METHOD FOR PROVIDING VIRTUAL IMAGE CORRESPONDING TO DIGITAL ITEM, AND AUGMENTED REALITY DEVICE

CROSS-REFERENCE TO RELATED APPLICATION(S)

This application is a continuation application, claiming priority under § 365 (c), of an International application No. PCT/KR2023/010014, filed on Jul. 13, 2023, which is based on and claims the benefit of a Korean patent application number 10-2022-0107161, filed on Aug. 25, 2022, in the Korean Intellectual Property Office, and of a Korean patent application number 10-2022-0126514, filed on Oct. 4, 2022, in the Korean Intellectual Property Office, the disclosure of each of which is incorporated by reference herein in its entirety.

BACKGROUND

1. Field

The disclosure relates to an augmented reality device and a method of providing a virtual image corresponding to a digital item.

2. Description of Related Art

Augmented reality is a technology that shows an image combining a virtual world or object with a real world or object by projecting a virtual image on a physical environmental space or an object of the real world.

An augmented reality device shows a real scene and a virtual image together, through a see-through type display arranged in front of the eyes of a user and worn on the face or head of the user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an augmented reality device and a method of providing a virtual image corresponding to a digital item.

Additional aspects will be set forth in part in the description which follows and, in part, will be apparent from the description, or may be learned by practice of the presented embodiments.

In accordance with an aspect of the disclosure, a method of providing a virtual image corresponding to a digital item is provided. The method includes generating the virtual image corresponding to the digital item owned by a user of an augmented reality device, obtaining mapping location information of a real world object to which the generated virtual image is to be mapped, mapping and rendering the virtual image based on the obtained mapping location information, and displaying the rendered virtual image on a display of the augmented reality device according to public setting information.

In accordance with another aspect of the disclosure, a computer-readable recording medium having recorded thereon a program for executing the method described above is provided.

In accordance with another aspect of the disclosure, an augmented reality device providing a virtual image corresponding to a digital item is provided. The augmented reality device includes memory storing one or more computer programs, a camera, a display engine unit, a display, a gaze tracking sensor, and one or more processors communicatively coupled to the camera, the display engine unit, the display, and the gaze tracking sensor, wherein the one or more computer programs include computer-executable instructions that, when executed by the one or more processors individually or collectively, cause the augmented reality device to control the display engine unit to generate a virtual image corresponding to a digital item owned by a user of the augmented reality device, obtain mapping location information of a real world object, to which the generated virtual image is to be mapped, by using the camera and the gaze tracking sensor, map and render the virtual image based on the obtained mapping location information by controlling the display engine unit, and display the rendered virtual image on the display according to public setting information.

In accordance with another aspect of the disclosure, one or more non-transitory computer-readable storage media storing computer-executable instructions that, when executed by one or more processors individually or collectively, cause an augmented reality device to perform operations of providing a virtual image corresponding to a digital item are provided. The operations include generating the virtual image corresponding to the digital item owned by a user of an augmented reality device, obtaining mapping location information of a real world object to which the generated virtual image is to be mapped, mapping and rendering the virtual image based on the obtained mapping location information, and displaying the rendered virtual image on a display of the augmented reality device according to public setting information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
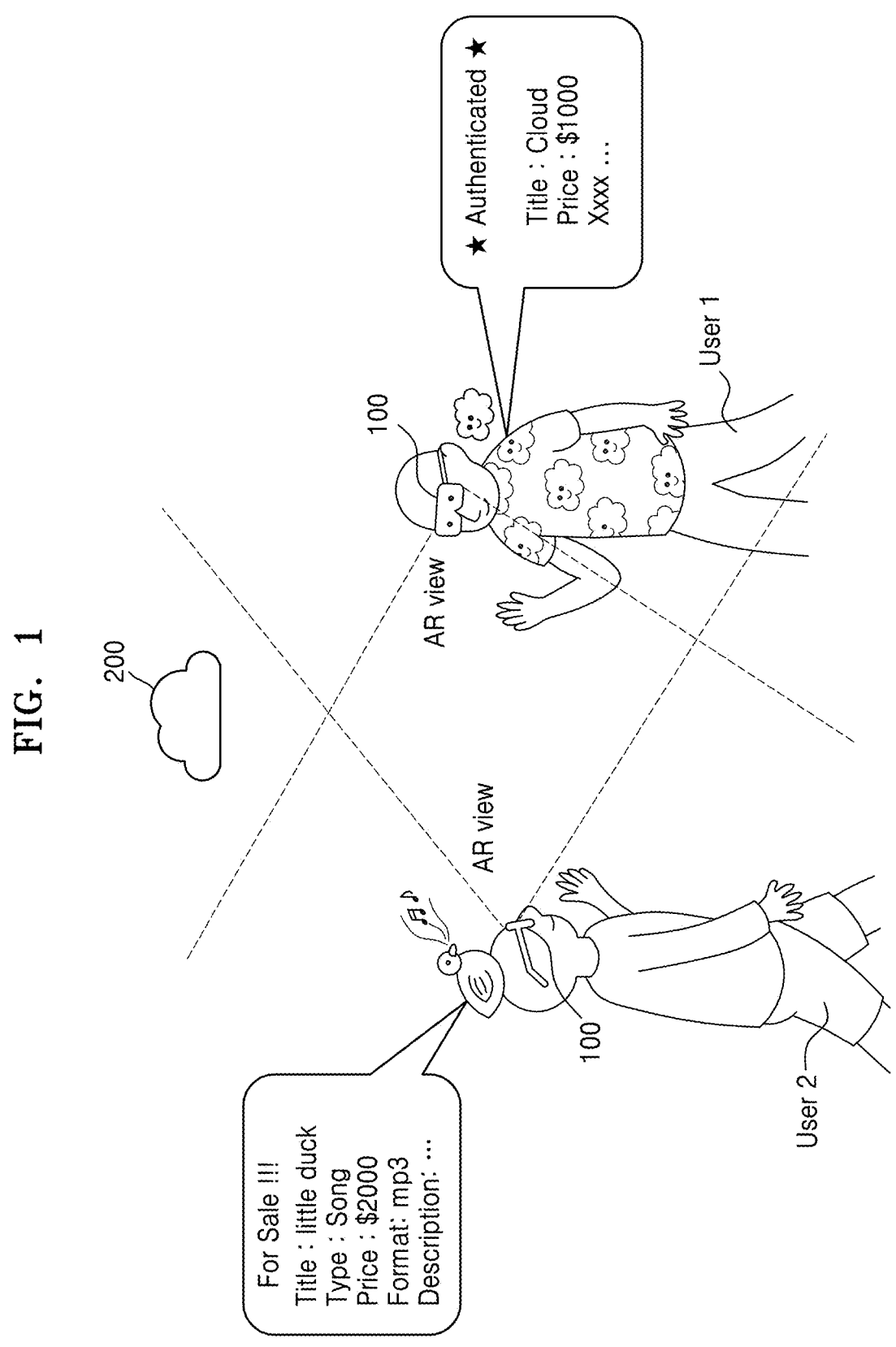
FIG. 1 illustrates a user wearing an augmented reality device checks a virtual image corresponding to a digital item through an augmented reality device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used herein will be briefly described, and then the disclosure will be described below. As used herein, the expression "at least one of a, b, or c" may indicate only a, only b, only c, both a and b, both a and c, both b and c, all of a, b, and c, or variations thereof.

Although the terms used herein are selected from among common terms that are currently widely used based on their functions in the disclosure, the terms may be different according to an intention of one of ordinary skill in the art, a precedent, or the advent of new technology. In addition, in specific cases, there are also terms arbitrarily selected by the applicant, and in this case, the meaning thereof will be defined in the description. Therefore, the terms used herein are not merely designations of the terms, but the terms are defined based on the meaning of the terms and content throughout the disclosure.

All the terms used herein, including technical and scientific terms, may have the same meanings as those generally understood by those of skill in the art. In addition, although the terms, such as 'first' or 'second' may be used herein to describe various elements, these elements should not be limited by these terms. These terms are only used to distinguish one element from another element.

Throughout the specification, when a part "includes" an element, it means that the part may additionally include other elements rather than excluding other elements as long as there is no particular opposing recitation. In addition, as used herein, the terms, such as " . . . er (or)", " . . . unit", " . . . module", or the like, denote a unit that performs at least one function or operation, which may be implemented as hardware or software or a combination thereof.

The disclosure may have different forms and should not be construed as being limited to the embodiments described herein.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global position-ing system (GPS) chip, a near field communication (NFC) chip, connectivity chips, a sensor controller, a touch con-troller, a finger-print sensor controller, a display drive inte-grated circuit (IC), an audio CODEC chip, a universal serial bus (USB) controller, a camera controller, an image pro-cessing IC, a microprocessor unit (MPU), a system on chip (SoC), an IC, or the like.

Hereinafter, the disclosure will be described with refer-ence to the attached drawings.

FIG. illustrates a user wearing an augmented reality device checks a virtual image corresponding to a digital item through an augmented reality device according to an embodiment of the disclosure.

Referring to FIG. 1, an augmented reality device 100 is a device capable of expressing augmented reality. 'Aug-mented reality' means showing a virtual image in a physical environment space of the real world or showing a real world object and a virtual image together. The augmented reality device 100 may be in the form of an augmented reality glasses device in the shape of glasses, a head mounted display apparatus (HMD), or an augmented reality helmet.

A server 200 provides an augmented reality service to the augmented reality device 100. The server 200 may receive information related to the augmented reality service from the augmented reality device 100 and transmit information related to the augmented reality service to the augmented reality device 100. The server 200 may provide a platform for the augmented reality service and provide the augmented reality service to the augmented reality device 100 of a user who is registered for the augmented reality service or subscribes to the augmented reality service. The augmented reality devices 100 may exchange information with each other through the server 200, and the augmented reality devices 100 within a predetermined range may be connected to each other through direct communication.

Referring to FIG. 1, a scene may be seen where users wearing the augmented reality device 100 meet and check each other's digital items by checking, through the aug-mented reality device 100, virtual images that are permitted to be disclosed. 'Digital items' are digital assets that may be purchased or traded on various online platforms. For example, digital items may be products that may be traded with virtual currency on a virtual world platform, such as the metaverse, user generated content (UGC), items purchased on an online game platform, art Non-fungible tokens (NFTs), profile NFTs, character NFTs, or the like. By providing digital items dependent on a specific platform as virtual images on an augmented reality platform, users using the augmented reality service may disclose or promote their own digital assets to others and may use their own digital assets as a means of expressing or showing off their affili-ation or identity.

Referring to FIG. 1, a first user User 1 may check, through an augmented reality device 100, a virtual image corre-sponding to a digital item owned by a second user User 2. The digital item owned by the second user User 2 has a title of 'little duck', a type of 'song', a price of '$2000', and a format of 'mp3' and is on sale, and a virtual image corre-sponding to the digital item is displayed above the head of the second user User 2. The second user User 2 may check, through the augmented reality device 100, a virtual image corresponding to a digital item owned by the first user User 1. The digital item owned by the first user User 1 has a title of 'Cloud' and a price of '$1000' and is a digital item certified as a character NFT, and a virtual image correspond-ing to the digital item is displayed on the upper garment of the first user User 1.

Hereinafter, a method of providing a virtual image cor-responding to a digital item owned by a user to a real world object of augmented reality viewed through the augmented reality device 100 and the augmented reality device 100 that performs the method will be described.

Figure 2:
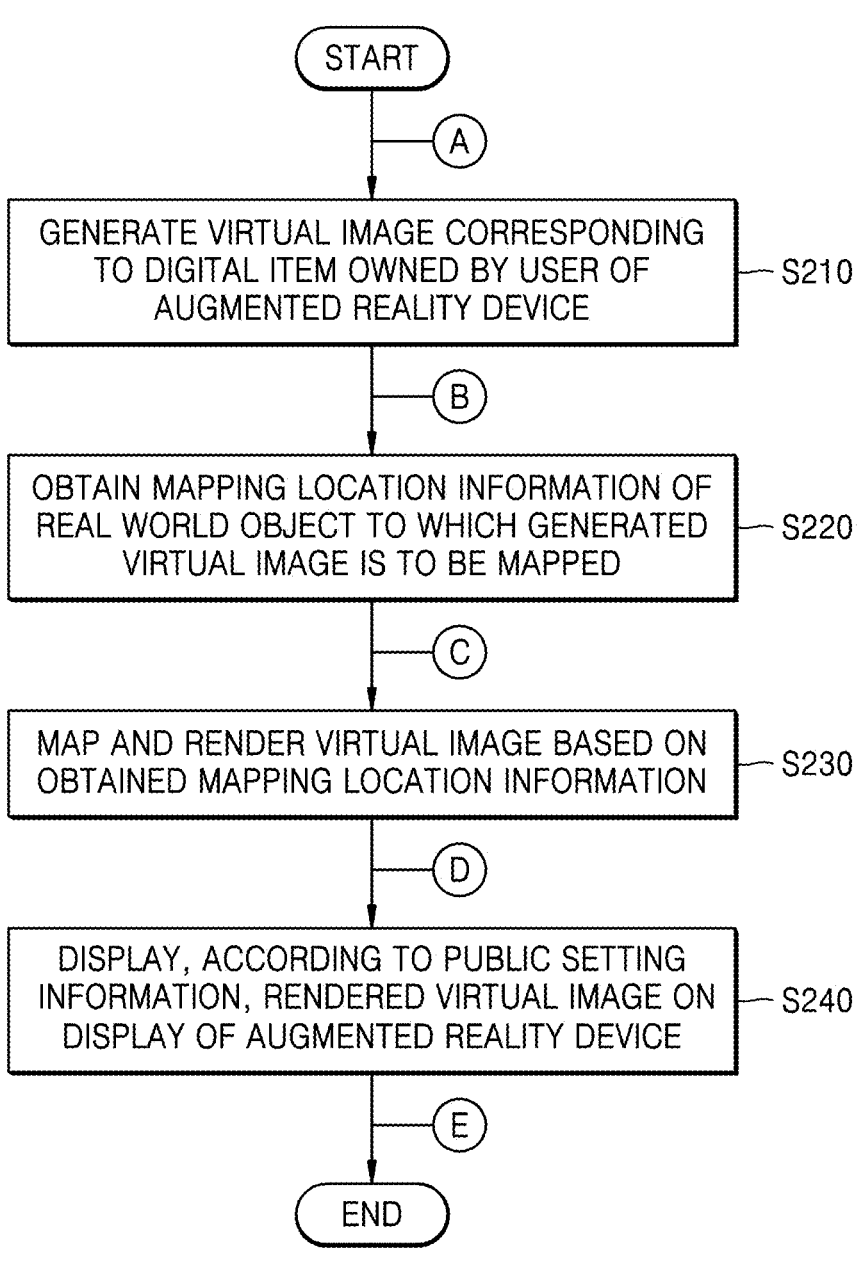
FIG. 2 is a flowchart illustrating a method of providing a virtual image corresponding to a digital item according to an embodiment of the disclosure.

FIG. 2 is a flowchart illustrating a method of providing a virtual image corresponding to a digital item according to an embodiment of the disclosure.

Referring to FIG. 2, the augmented reality device 100 may generate a virtual image corresponding to a digital item owned by a user of the augmented reality device 100 in operation S210. The user of the augmented reality device 100 may obtain information on digital items owned by the user in various platforms by using an augmented reality service. The augmented reality device 100 may generate a virtual image corresponding to a digital item based on the information on digital items owned by the user of the augmented reality device 100. Hereinafter, this will be described with reference to FIGS. 3 to 8.

Figure 3:
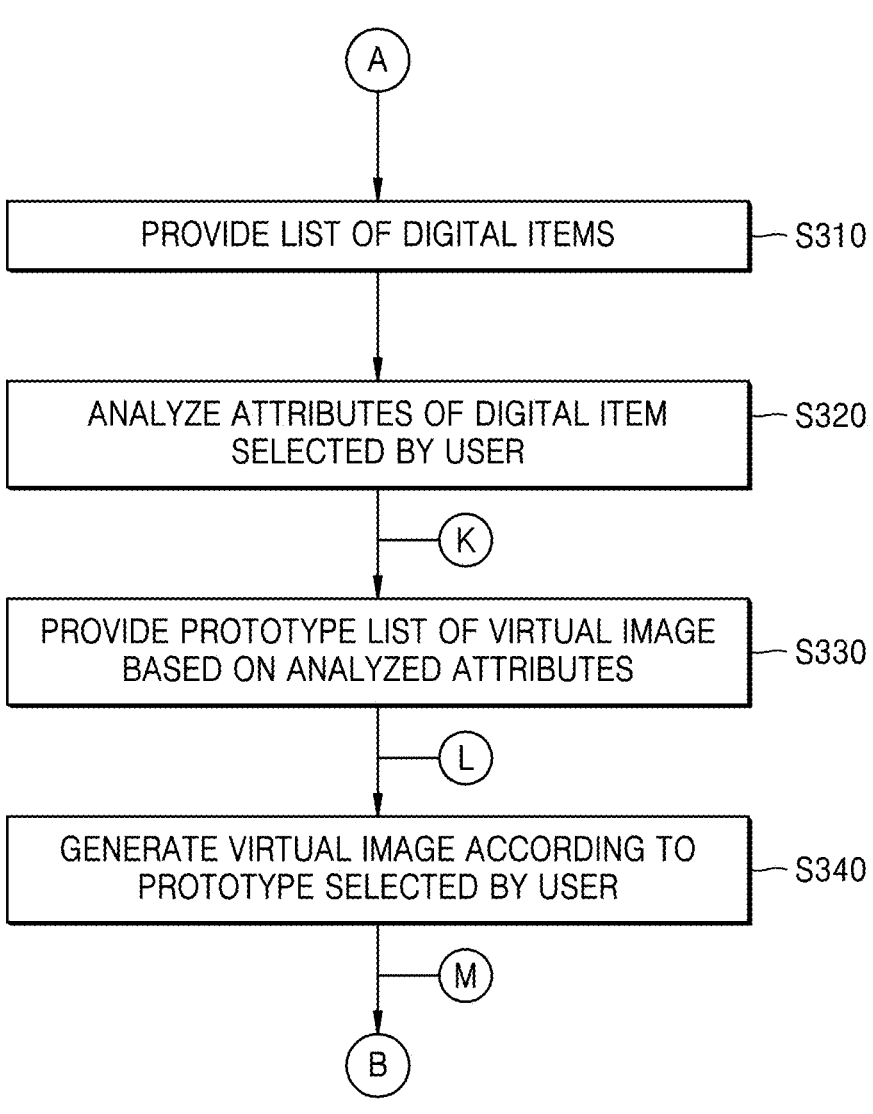
FIG. 3 is a flowchart of an operation of generating a virtual image corresponding to a digital item according to an embodiment of the disclosure.

FIG. 3 is a flowchart of an operation of generating a virtual image corresponding to a digital item according to an embodiment of the disclosure.

Referring to FIG. 3, the augmented reality device 100 may provide a list of digital items owned by the user of the augmented reality device 100 in operation S310. The aug-mented reality device 100 may list digital items owned by the user in each of various online platforms and show the listed digital items to the user in the form of virtual images. For example, the list of digital items may include items available on a specific platform, content purchased by the user, game items, various types of NFTs, or the like.

The augmented reality device 100 may analyze the attri-butes of a digital item selected by the user of the augmented reality device 100 in operation S320. The augmented reality device 100 may check the digital item selected by the user from the list of digital items and analyze the attributes of the corresponding digital item. The user may select a specific digital item from the list of digital items by using at least one of gaze, motion, touch, and voice.

The augmented reality device 100 may provide a proto-type list of virtual images based on the analyzed attributes in operation S330. The augmented reality device 100 may check the type, format, or the like, of the digital item selected by the user by using metadata and may check whether the digital item includes an image. The prototype of a virtual image means a preview image that shows only the key features of the image before actually creating the virtual image. Hereinafter, this will be described with reference to FIGS. 4 to 6.

Figure 4:
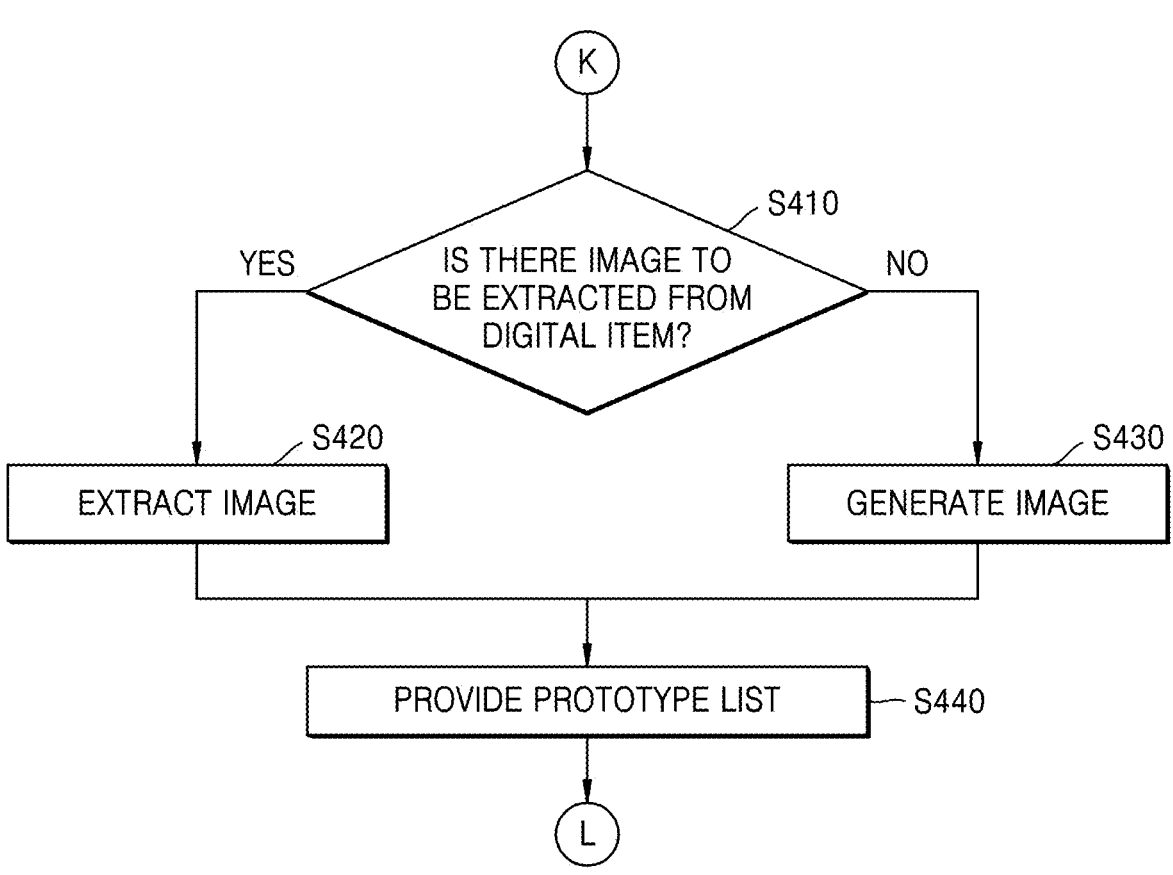
FIG. 4 is a flowchart of an operation of providing a prototype list of virtual images according to an embodiment of the disclosure.

FIG. 4 is a flowchart of an operation of providing a prototype list of virtual images according to an embodiment of the disclosure.

Referring to FIG. 4, the augmented reality device 100 may determine whether there is an image to be extracted from a digital item selected by the user of the augmented reality device 100 in operation S410. The digital item may include an image related to the digital item, for example, a content in the form of a photo, a video, or a three-dimen-sional (3D) image, or a representative image, such as an icon or a thumbnail.

When there is an image to be extracted from the selected digital item, the augmented reality device 100 may extract an image from the selected digital item in operation S420. The augmented reality device 100 may extract some elements of the image from the selected digital item, or may extract a cropped image, an image corresponding to a scene, a part of an image, or the entire image.

When there is no image to be extracted from the selected digital item, the augmented reality device 100 may generate an image based on the attributes of the selected digital item in operation S430. For example, when the digital item is in the form of text or sound source, there may be no image to be extracted from the digital item. In this case, the augmented reality device 100 may perform a task of visualizing the corresponding digital item. For example, based on the metadata information of the digital item, the augmented reality device 100 may generate, as an image of the corresponding digital item, a symbol image that symbolically or abstractly represents the type of the corresponding digital item. Alternatively, the augmented reality device 100 may generate, as an image of a corresponding digital item, a two-dimensional (2D) or 3D image reflecting the corresponding information by using information about the title or format of the digital item.

The augmented reality device 100 may provide a prototype list of virtual images based on the extracted image or the generated image in operation S440. In this regard, the following description will be made with reference to examples of FIGS. 5 and 6.

Figure 5:
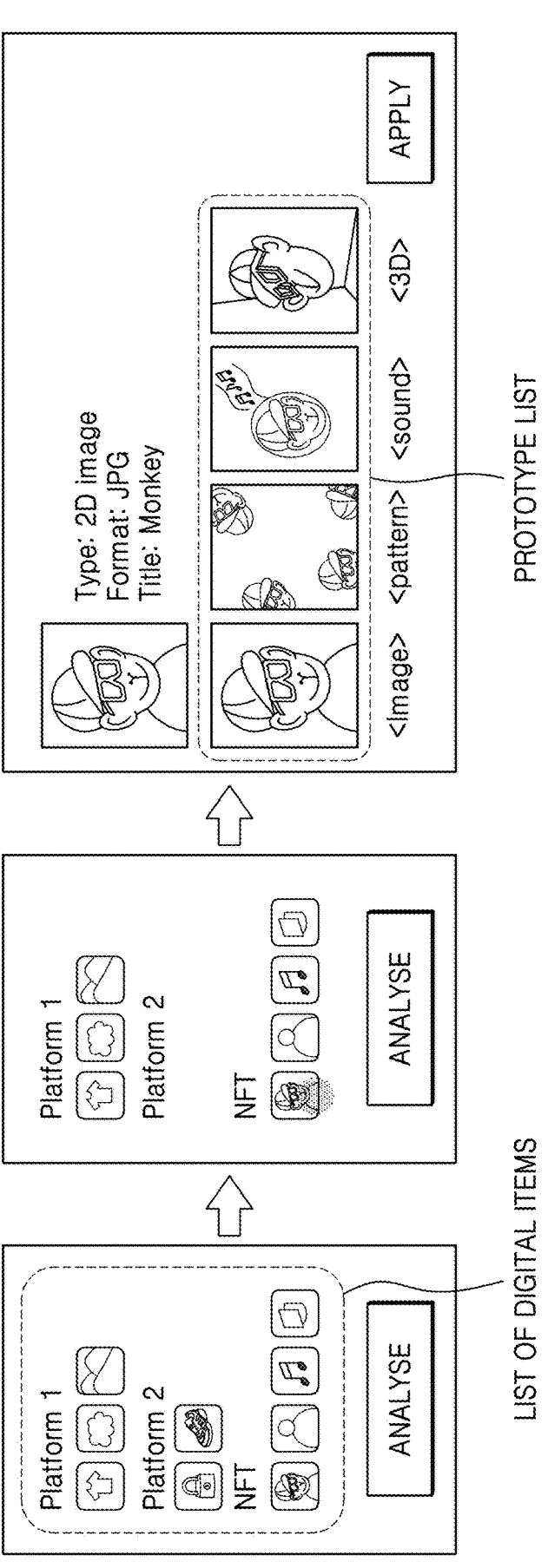
FIG. 5 is a diagram illustrating providing a prototype list of virtual images based on an image extracted from a digital item selected from a list of digital items according to an embodiment of the disclosure.

FIG. 5 is a diagram illustrating providing a prototype list of virtual images based on an image extracted from a digital item selected from a list of digital items according to an embodiment of the disclosure.

Referring to FIG. 5, the list of digital items includes three items of the first platform Platform 1, two items of the second platform Platform 2, and four NFTs. The user of the augmented reality device 100 may request an analysis of the first character NFT by selecting the first character NFT from among the four NFTs.

The augmented reality device 100 may analyze the character NFT selected by the user of the augmented reality device 100 and may confirm graphic information, such as a type of '2D image', a format of 'JPG', a title of 'Monkey', and an image of a monkey wearing a hat and glasses. The augmented reality device 100 may confirm that the character NFT selected by the user includes an image of a 'monkey wearing a hat and glasses'. The augmented reality device 100 may extract an image of a 'monkey wearing a hat and glasses' from the corresponding character NFT and provide a prototype list including an original image, a patterned image, an image having an inserted sound source, an image in a 3D form, or the like.

Figure 6:
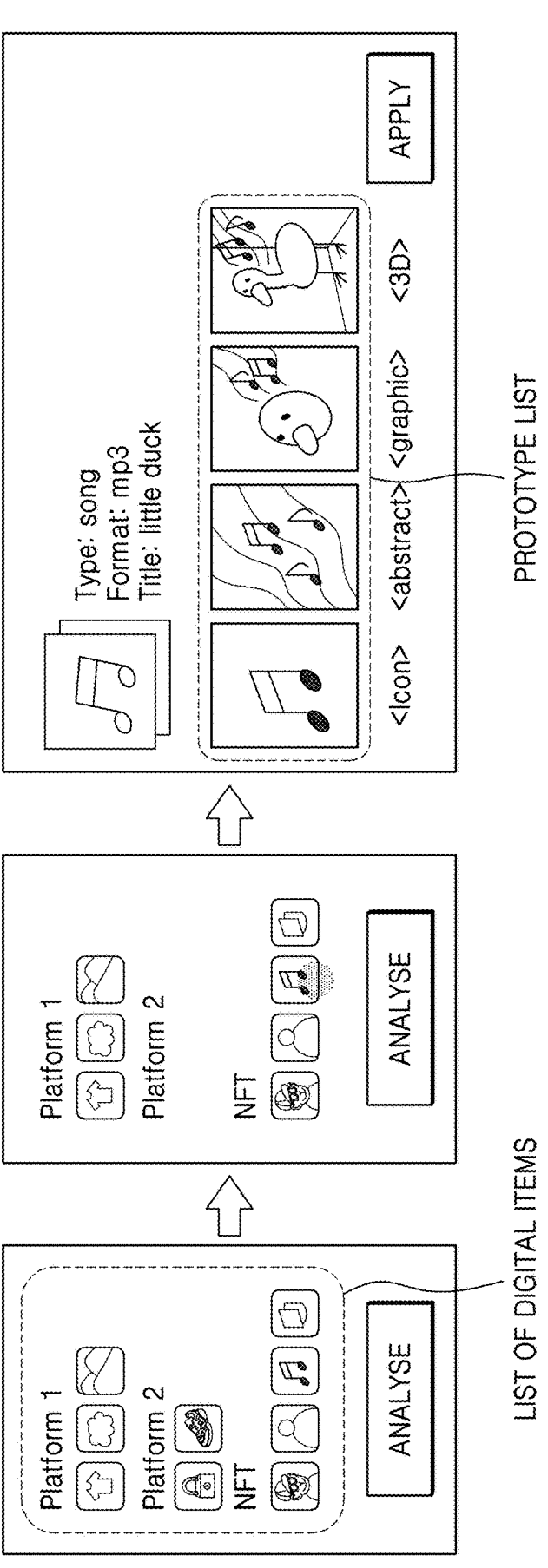
FIG. 6 is a diagram illustrating providing a prototype list of virtual images based on an image generated based on attributes of a digital item selected from a list of digital items according to an embodiment of the disclosure.

FIG. 6 is a diagram illustrating providing a prototype list of virtual images based on an image generated based on the attributes of a digital item selected from a list of digital items according to an embodiment of the disclosure.

Referring to FIG. 6, the list of digital items includes three items of the first platform Platform 1, two items of the second platform Platform 2, and four NFTs. The user of the augmented reality device 100 may request an analysis of the third sound source NFT by selecting the third sound source NFT from among the four NFTs.

The augmented reality device 100 may analyzes the sound source NFT selected by the user of the augmented reality device 100 and may find out that the type is 'song', the format is 'mp3', the title is 'little duck', and there is no image to be extracted from the sound source NFT. The augmented reality device 100 may provide a prototype list including a song icon, an image abstractly representing a song score, a 2D or 3D image reflecting a small duck shape, or the like, based on the metadata or attributes of the corresponding sound source NFT.

Referring back to FIG. 3, the augmented reality device 100 may generate a virtual image according to a prototype selected by the user of the augmented reality device 100 in operation S340. Hereinafter, this will be described with reference to FIGS. 7 and 8.

Figure 7:
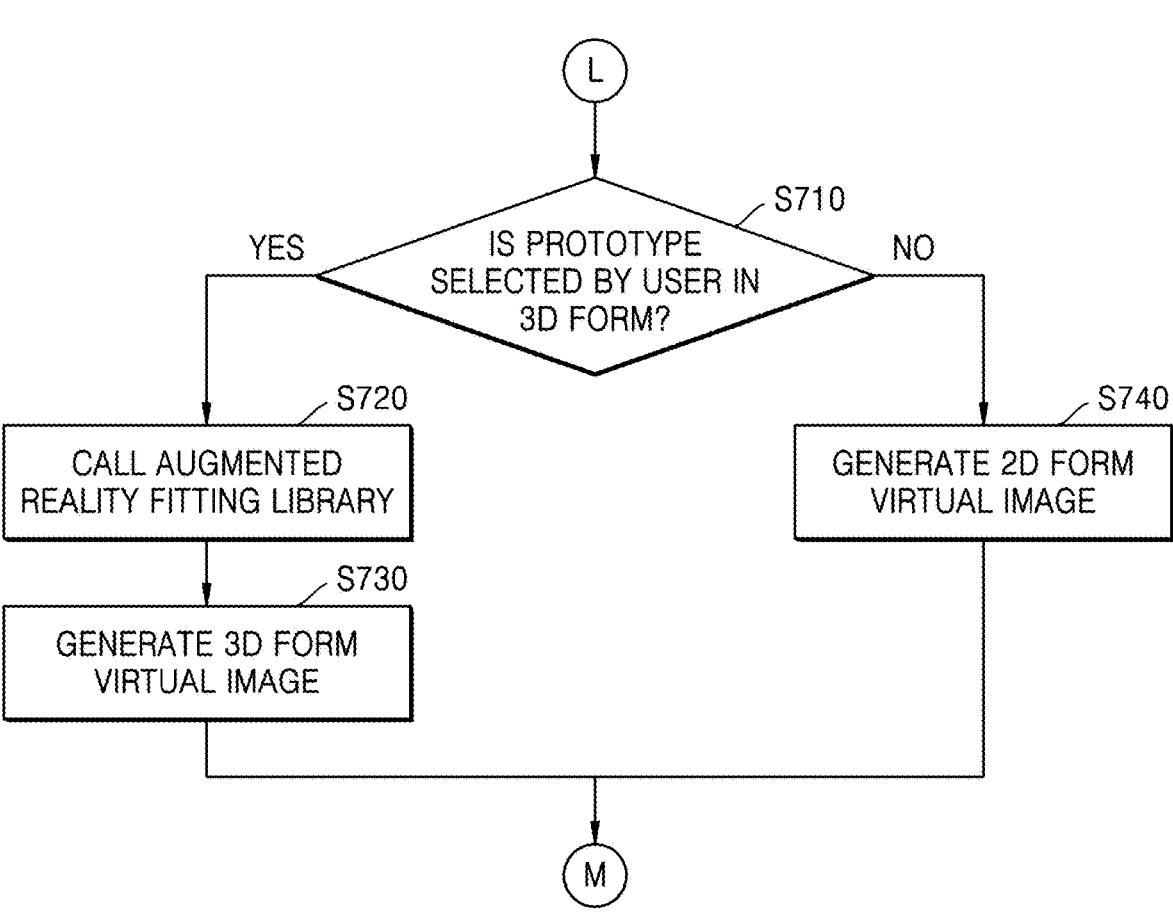
FIG. 7 is a flowchart of an operation of generating a virtual image according to a prototype selected by a user according to an embodiment of the disclosure.

FIG. 7 is a flowchart of an operation of generating a virtual image according to a prototype selected by the user according to an embodiment of the disclosure.

Referring to FIG. 7, the augmented reality device 100 may determine whether a prototype selected by the user of the augmented reality device 100 is in a 3D form in operation S710. Unlike a 2D form image (i.e., an image in a 2D form), a 3D form image (i.e., an image in a 3D form) included in a prototype list may be used by calling an augmented reality fitting library.

When the selected prototype is in a 3D form, the augmented reality device 100 may call an augmented reality fitting library in operation S720. The augmented reality fitting library may be used to show a 3D form virtual image (i.e., a virtual image in a 3D form) to the user and generate a 3D form virtual image.

The augmented reality device 100 may generate a 3D form virtual image by using the augmented reality fitting library in operation S730. The augmented reality device 100 may provide a mirror mode or a virtual character mode so that the user may experience a 3D form virtual image. For example, when a 3D form virtual image is something worn on the face or head, such as glasses or a hat, a mirror mode or a virtual character mode may be provided because the user's ability to see his or her own appearance through the augmented reality device 100 is limited. The mirror mode is a method of providing a 3D scan of the user's appearance reflected in a mirror through a camera provided in the augmented reality device 100. The virtual character mode is a method of providing a virtual character, such as an avatar, corresponding to the user. The augmented reality device 100 may put a 3D form virtual image on a user seen in the mirror or a virtual character through the mirror mode or the virtual character mode. In this way, when putting a 3D form virtual image on a user seen in the mirror or a virtual character through the mirror mode or the virtual character mode, it is possible to obtain mapping location information of a real world object to which a virtual image is to be mapped, and thus, the process of obtaining the mapping location information of the real world object may be replaced.

When the selected prototype is not in a 3D form, the augmented reality device 100 may generate a 2D form virtual image according to the selected prototype in operation S740. The augmented reality device 100 may generate a 2D form virtual image according to a prototype selected from the prototype list, for example, an original image, a patterned image, an image having an inserted sound source, an icon image, or the like.

Figure 8:
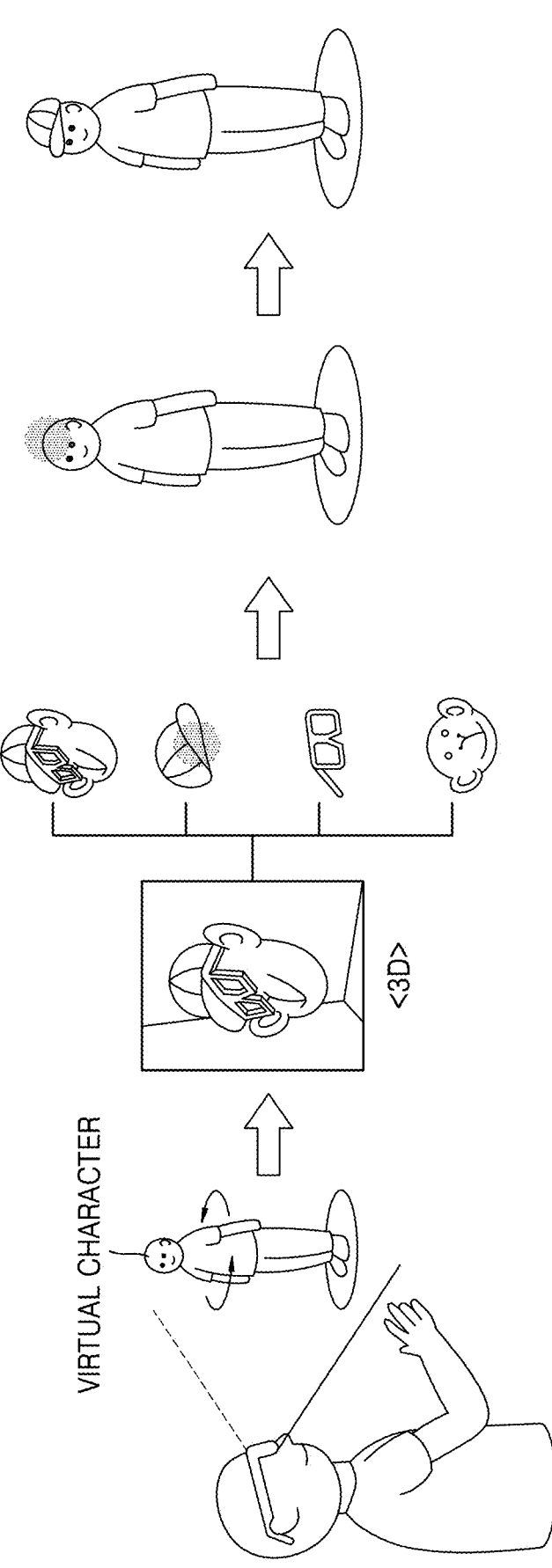
FIG. 8 illustrates calling an augmented reality fitting library to generate a three-dimensional (3D) form virtual image and putting a 3D form virtual image on a virtual character, when a prototype selected by a user is in a 3D form, according to an embodiment of the disclosure.

FIG. 8 illustrates calling an augmented reality fitting library to generate a 3D form virtual image and putting a 3D form virtual image on a virtual character, when a prototype selected by a user is in a 3D form, according to an embodiment of the disclosure.

FIG. 8 illustrates a process in which, in the example of FIG. 5 discussed above, when a user selects a 3D image from a prototype list, an augmented reality device puts a 3D form virtual image on a virtual character through the virtual character mode.

The augmented reality device 100 may provide a virtual character, such as an avatar corresponding to the user, as a 3D form virtual image. The augmented reality device 100 may provide a list of 3D form images, such as 'monkey wearing a hat and glasses', 'hat', 'glasses', and 'monkey', by using an image extracted from a character NFT selected by the user. The user may select a 'hat' from the list of 3D images and select a location to put the selected hat on the virtual character. The augmented reality device 100 may show a virtual character with a 3D hat on the head of the virtual character according to the user's selection.

Referring back to FIG. 2, the augmented reality device 100 may obtain mapping location information of a real world object to which a generated virtual image is to be mapped in operation S220. The real world object may be a part of the user's body, clothing worn by the user, or personal belongings. Hereinafter, a detailed description will be given with reference to FIGS. 9 and 10.

Figure 9:
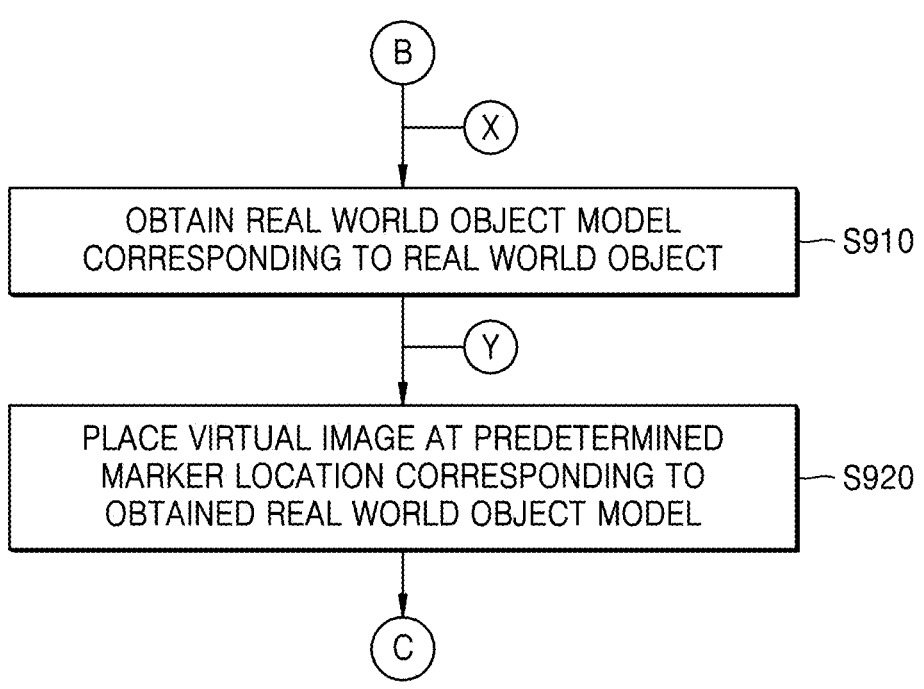
FIG. 9 is a flowchart of an operation of obtaining mapping location information of a real world object to which a virtual image is to be mapped according to an embodiment of the disclosure.

FIG. 9 is a flowchart of an operation of obtaining mapping location information of a real world object to which a virtual image is to be mapped according to an embodiment of the disclosure.

The user of the augmented reality device 100 has to decide where to place a generated virtual image on the real world object after going through the process of generating the virtual image corresponding to a digital item he or she owns. The user of the augmented reality device 100 may specify a part to which the real world object and the virtual image are to be mapped based on at least one of gaze, motion, touch, and voice.

Referring to FIG. 9, the augmented reality device 100 may obtain a real world object model corresponding to the real world object in operation S910. For example, after the virtual image is generated, the user of the augmented reality device 100 may look at a specific part of the real world object to which the generated virtual image is to be mapped. When a part of the real world object is specified by the user's gaze, the augmented reality device 100 may obtain a real world object model corresponding to the specified real world object.

When there is a real world object model already stored in the augmented reality device 100, the augmented reality device 100 may call up a real world object model corresponding to a real world object specified by the user. When the augmented reality device 100 does not have a real world object model corresponding to a reality world object specified by the user, the augmented reality device 100 may receive a reality world object model from the outside, or may proceed with a process of generating a real world object model corresponding to a real word object specified by the user. Hereinafter, an example of generating a real world object model will be described with reference to FIG. 10.

Figure 10:
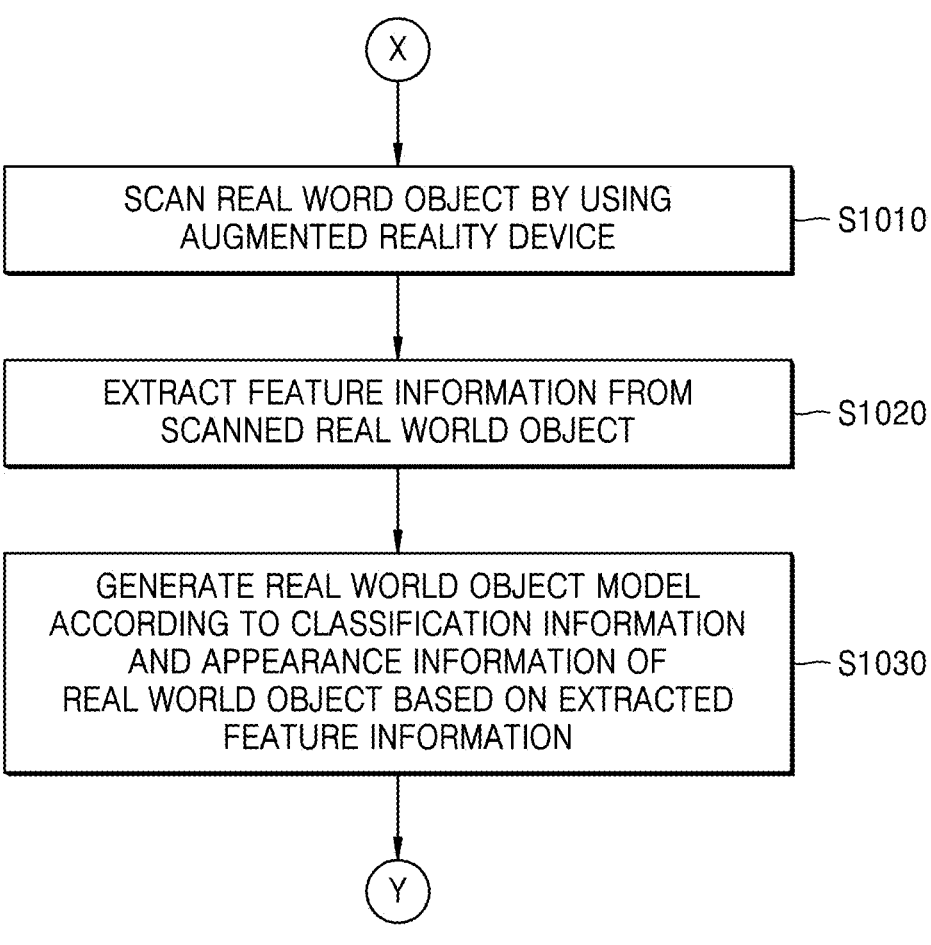
FIG. 10 is a flowchart of an operation of obtaining a real world object model corresponding to a real world object according to an embodiment of the disclosure.

FIG. 10 is a flowchart of an operation of obtaining a real world object model corresponding to a real world object according to an embodiment of the disclosure.

Referring to FIG. 10, a real word object may be scanned by using the augmented reality device 100 in operation S1010. For example, the augmented reality device 100 may scan a real world object by using a camera. The augmented reality device 100 may obtain depth information from a scanned image. The augmented reality device 100 may obtain a 3D scan result for the real world object by using a plurality of captured images and a depth map including the depth information. For another example, the augmented reality device 100 may execute a mirror mode to three-dimensionally scan the user's appearance reflected in a mirror, or execute a virtual character mode to obtain, as a 3D scan result, a virtual character three-dimensionally modeled using a plurality of images captured for the user.

In operation S1020, the augmented reality device 100 may extract feature information from a scanned real world object. For example, the augmented reality device 100 may extract feature vectors from the 3D scan result.

In operation S1030, the augmented reality device 100 may generate a real world object model according to the classification information and the appearance information of the real world object based on the extracted feature information. For example, the augmented reality device 100 may input the feature vectors into an image classification model, an object localization model, an object detection model, or the like, such as a deep neural network (DNN), a convolution neural network (CNN), a recurrent neural network (RNN), and a bidirectional recurrent deep neural network (BRDNN), and perform object classification, appearance information measurement, object detection, or the like. The augmented reality device 100 may classify a real world object according to image classification, and may localize the real world object into a bounding box to measure the appearance information. The augmented reality device 100 may detect and model the real world object and generate a real world object model.

Referring back to FIG. 9, the augmented reality device 100 may place a virtual image at a predetermined marker location corresponding to an obtained real world object model in operation S920. The real world object model may have at least one marker. The marker may be located at a part that may be a feature of the real world object model. For example, the marker may be located at the center or a protruding part of the real world object model. The augmented reality device 100 may set at least one marker on the real world object model, and when a location to map a virtual image is determined according to the user's input, the augmented reality device 100 may obtain mapping location information of the real world object. For example, a user wearing the augmented reality device 100 may obtain mapping location information of the real world object by selecting a specific part of the real world object viewed through the augmented reality device 100 or dragging and dropping a generated virtual image onto a specific part of the real world object.

Referring back to FIG. 2, the augmented reality device 100 may map and render a virtual image based on the obtained mapping location information in operation S230. This will be described below with reference to FIG. 11.

Figure 11:
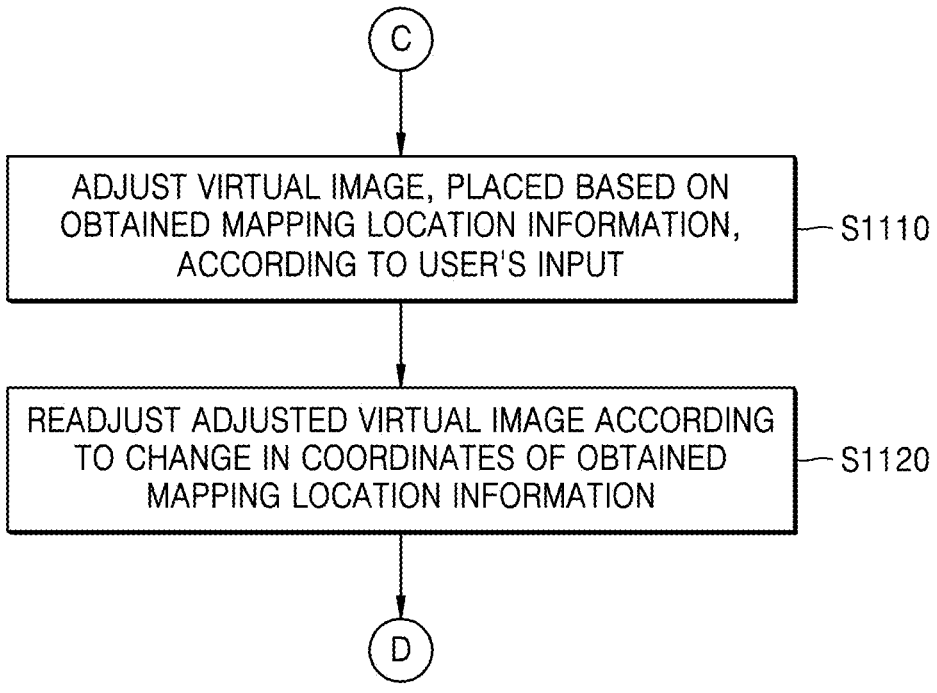
FIG. 11 is a flowchart of an operation of mapping and rendering a virtual image according to an embodiment of the disclosure.

FIG. 11 is a flowchart of an operation of mapping and rendering a virtual image according to an embodiment of the disclosure.

Referring to FIG. 11, the augmented reality device 100 may adjust a virtual image, placed based on the obtained mapping location information, according to the user's input in operation S1110. The augmented reality device 100 may place the virtual image at a predetermined marker location of a real world object model based on the obtained mapping location information. The user wearing the augmented reality device 100 may adjust the location of a primarily placed virtual image or adjust the size of the virtual image so that the virtual image may be more perfectly mapped to the real world object.

The augmented reality device 100 may readjust the virtual image whose location or size is adjusted, according to a change in the coordinates of the obtained mapping location information in operation S1120. When the real world object moves, the coordinates of the obtained mapping location information must also change to reflect the movement of the real world object. The augmented reality device 100 may track the movement of the real world object and obtain movement parameters. The augmented reality device 100 may apply the movement parameters to a three-dimensionally modeled real world object model. Because the coordinates of the mapping location information of the real world object to which a virtual image is to be mapped also change, the augmented reality device may readjust the virtual image according to a change in the coordinates of the mapping location information.

Figure 12:
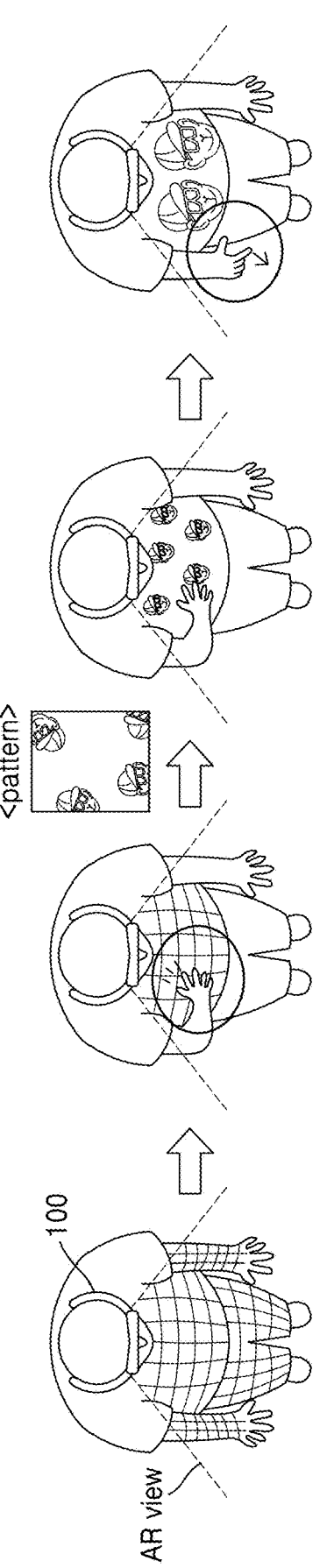
FIG. 12 is a diagram illustrating obtaining mapping location information of a real world object and adjusting, according to a user's input, a virtual image placed based on obtained mapping location information, according to an embodiment of the disclosure.

FIG. 12 is a diagram illustrating obtaining mapping location information of a real world object and adjusting, according to a user's input, a virtual image placed based on the obtained mapping location information, according to an embodiment of the disclosure.

Referring to FIG. 12, a user wearing the augmented reality device 100 specifies a mapping location of a real world object to which a virtual image corresponding to a digital item is to be mapped, and adjusts the virtual image placed at a corresponding location by using a finger interaction.

The augmented reality device 100 may scan, by using a camera, a real world object in the direction the user is looking. Referring to FIG. 12, an augmented reality view that the user wearing the augmented reality device 100 may experience includes real world objects, such as the user's arm, the front of the upper garment, the front of the lower garment, and the front of the shoe. The augmented reality device 100 may obtain a real world object model for the front of the upper garment selected by the user from among real world objects included in the augmented reality view. Alternatively, the augmented reality display device 100 may obtain a real world object model corresponding to each of the real world objects included in the augmented reality view, and then obtain a real world object model corresponding to the front of the upper garment selected by the user.

The augmented reality device 100 may obtain a real world object model for the front of the upper garment and obtain a predetermined marker location located in the center of the front of the upper garment as mapping location information. The augmented reality device 100 may place a virtual image in a patterned form on the obtained mapping location information. The augmented reality device 100 may adjust, according to the user's finger interaction, the size and location of the virtual image placed based on the obtained mapping location information, and then fix the size and location of the virtual image. As shown in FIG. 12, the augmented reality device 100 may place a patterned image in the shape of a 'monkey wearing a hat and glasses' on the center of the front of the upper garment based on the mapping location information, and then enlarge the patterned image according to the user's pinch-out gesture.

Referring back to FIG. 2, the augmented reality device 100 may display, according to public setting information, the rendered virtual image on the display of the augmented reality device 100 in operation S240. Hereinafter, referring to FIG. 13 and FIG. 14, this will be described below.

Figure 13:
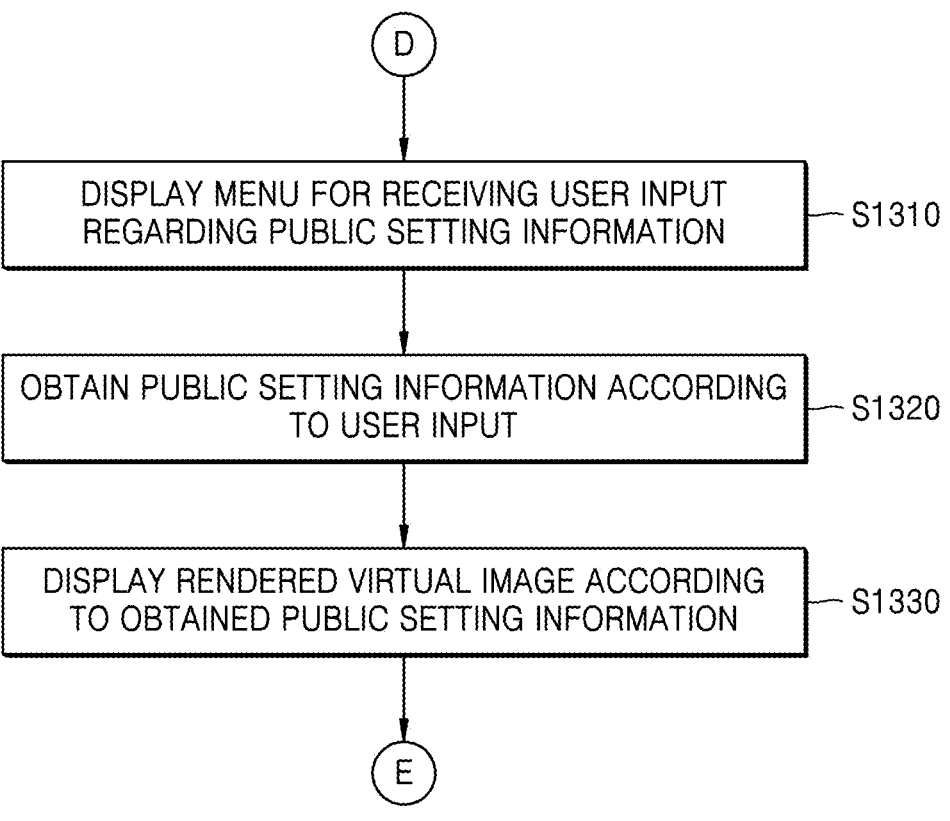
FIG. 13 is a flowchart of an operation of displaying, according to public setting information, a virtual image rendered on a display of an augmented reality device according to an embodiment of the disclosure.

FIG. 13 is a flowchart of an operation of displaying, according to public setting information, a virtual image rendered on a display of an augmented reality device according to an embodiment of the disclosure.

Referring to FIG. 13, the augmented reality device 100 may display a menu for receiving a user input regarding the public setting information in operation S1310. The 'public setting information' may include at least one of an item to be disclosed from among metadata items of a digital item corresponding to the rendered virtual image, a condition for disclosing the rendered virtual image, and an access right for the rendered virtual image.

The augmented reality device 100 may obtain the public setting information according to a user input in operation S1320. The augmented reality device 100 may obtain information about an item to be disclosed, a regional condition to be disclosed, a time condition to be disclosed, and those with access rights to a disclosed virtual image, according to a user input, in the menu for receiving the user input regarding the public setting information.

However, operations S1310 and S1320 may be performed not only immediately before generating a virtual image corresponding to a digital item and displaying the virtual image on the augmented reality device 100, but also in advance. For example, a user of the augmented reality device 100 may register public setting information in advance for all virtual images corresponding to digital items owned by the user.

In operation S1330, the augmented reality device 100 may display a rendered virtual image according to the obtained public setting information. For example, based on the public setting information, the augmented reality device 100 may display a rendered virtual image only for some users wearing the augmented reality device 100, may display a rendered virtual image only in a specific region or at a specific time, or may display only some of the metadata of a digital item together with the virtual image.

Figure 14:
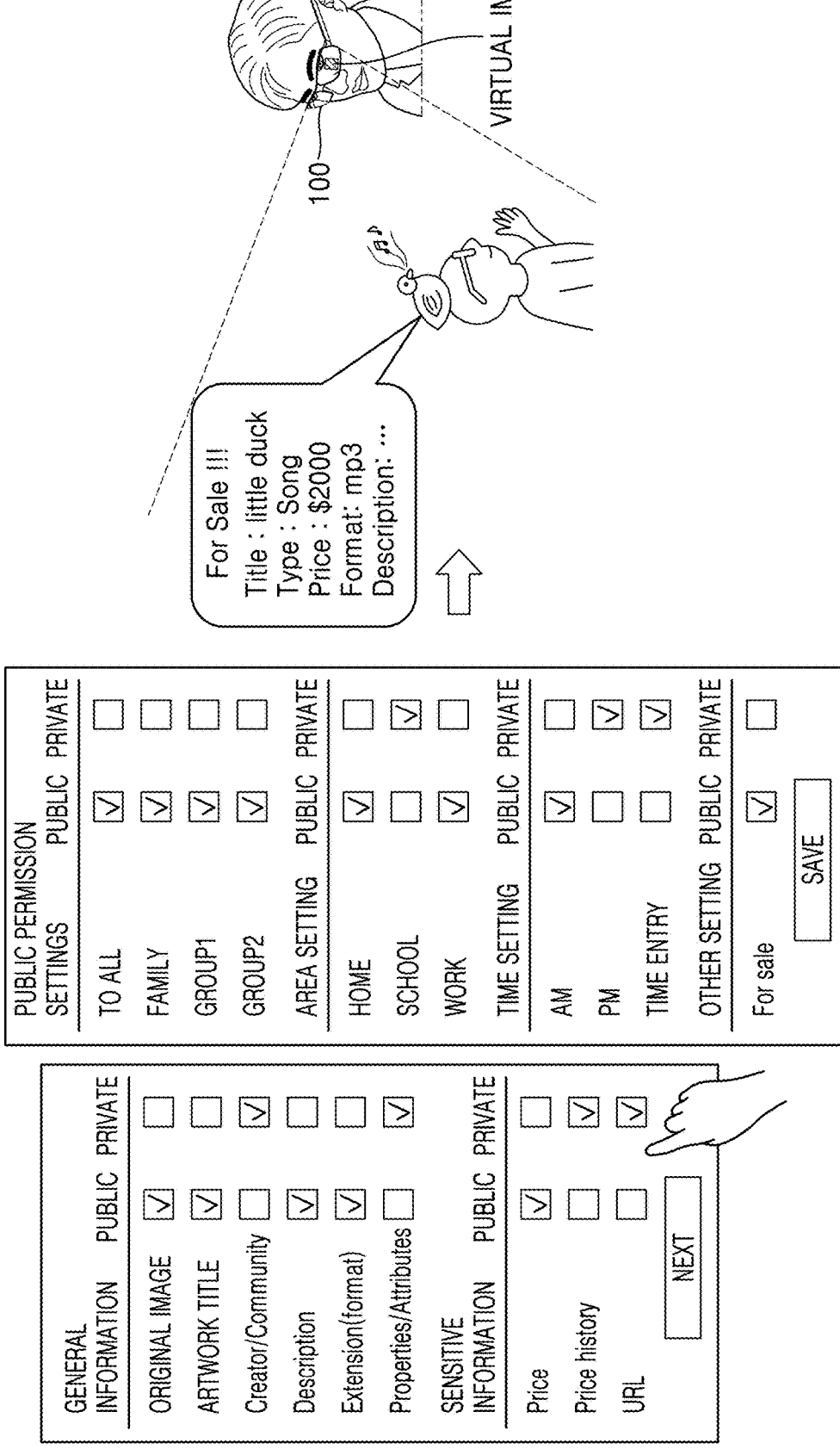
FIG. 14 illustrates obtaining public setting information according to a user input in a menu for receiving a user input for public setting information and displaying a rendered virtual image according to obtained public setting information according to an embodiment of the disclosure.

FIG. 14 illustrates obtaining public setting information according to a user input in a menu for receiving a user input for public setting information and displaying a rendered virtual image according to obtained public setting information according to an embodiment of the disclosure.

Referring to the 'menu for receiving a user input for public setting information' shown in FIG. 14, metadata items of a digital item are displayed by dividing the metadata items into general information and sensitive information and include a check menu for selecting items to be disclosed and items to be non-disclosed. Referring to FIG. 14, the general information includes 'original image', 'title of work', 'creator/community', 'description', 'extension (format)', 'properties/attributes', and the sensitive information includes 'price', 'price history', and 'URL'. However, the disclosure is not limited thereto. The 'menu for receiving a user input for public setting information' may further include a check menu for public permission settings, a check menu for regional settings, a check menu for time settings, and a check menu for other settings. Referring to FIG. 14, a virtual image is open to all users wearing the augmented reality device 100 so that all of the users may see the virtual image, and the virtual image is displayed only in the morning hours at home and at work. In addition, 'For sale' is displayed together with the virtual image in order to trade a digital item corresponding to the virtual image.

Figure 15:
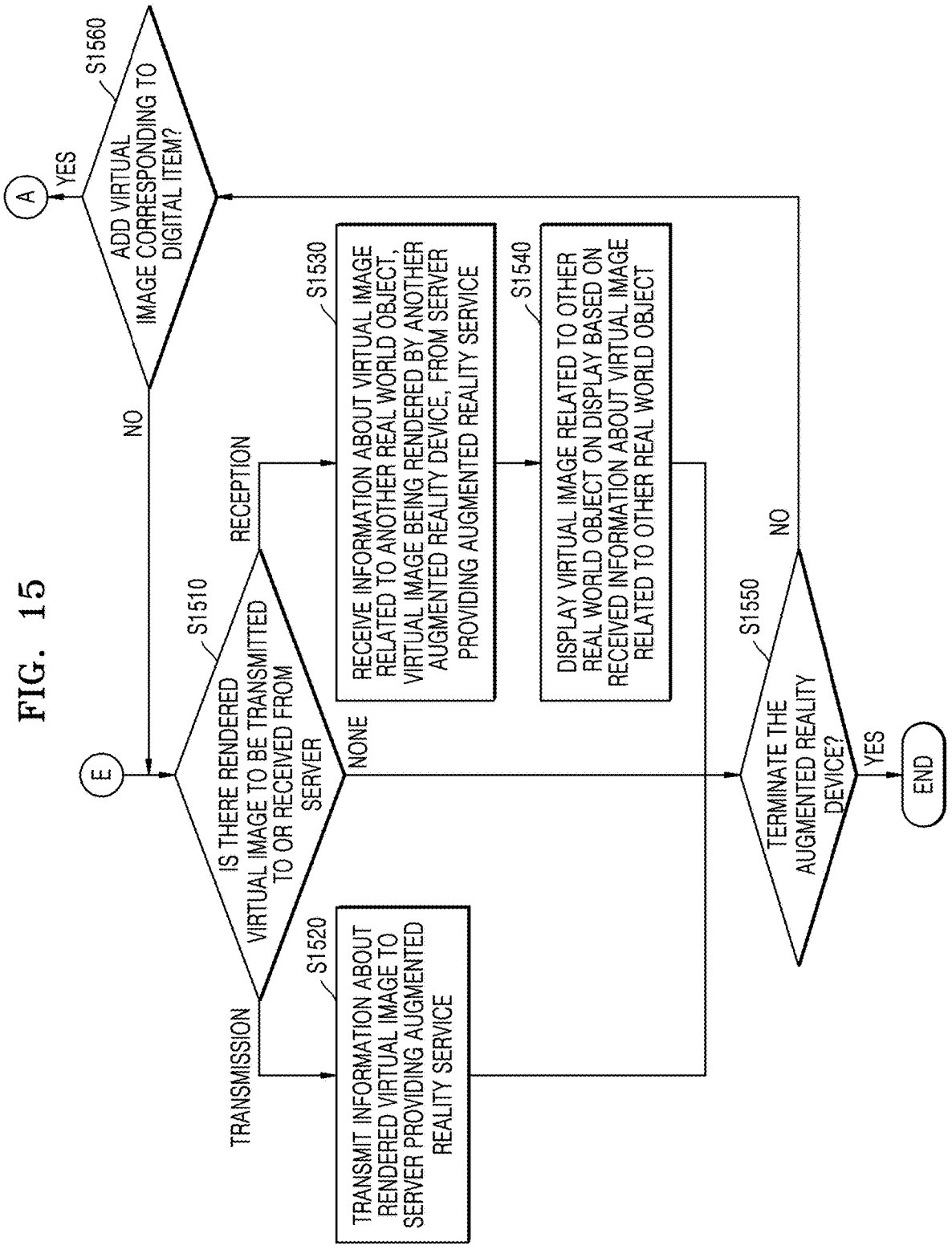
FIG. 15 is a flowchart of an operation of transmitting information about a rendered virtual image to a server providing an augmented reality service or of receiving information from a server according to an embodiment of the disclosure.

FIG. 15 is a flowchart of an operation of transmitting information about a rendered virtual image to a server providing an augmented reality service or of receiving the information from a server according to an embodiment of the disclosure.

The user of the augmented reality device 100 may share information about a virtual image corresponding to a digital item with other users. To this end, the augmented reality device 100 may perform communication with the server 200 providing an augmented reality service and transmit and receive information about the virtual image.

Referring to FIG. 15, the augmented reality device 100 may determine whether there is a rendered virtual image to be transmitted to or received from the server 200 providing an augmented reality service in operation S1510. The augmented reality device 100 may perform operation S1510 when a predetermined event occurs, such as when rendering of a virtual image is completed in the augmented reality device 100, when another augmented reality device 100 enters within a predetermined range from the augmented reality device 100, when information about a virtual image corresponding to a digital item owned by another user is received in the server 200, or when a certain cycle is repeated.

When there is a rendered virtual image to be transmitted to the server 200 providing the augmented reality service, the augmented reality device 100 may transmit information about the rendered virtual image to the server 200 providing the augmented reality service in operation S1520. The information about the rendered virtual image may include graphic information of a virtual image and mapping location information of a real world object. For example, when the rendering of a virtual image corresponding to a digital item is completed, the augmented reality device 100 may transmit graphic information of the rendered virtual image and map-ping location information of the real world object to the server 200 providing the augmented reality service. The graphic information of the rendered virtual image may include graphic information of an image extracted or gen-erated based on a digital item, metadata information of the digital item, and public setting information. The mapping location information of the real world object may be infor-mation indicating a predetermined mark location corre-sponding to a real world object model of a real world object determined according to camera and/or user's gaze infor-mation and an adjusted location that changes according to user input or movement of the real world object.

When there is a rendered virtual image to be received from the server 200 providing the augmented reality service, the augmented reality device 100 may receive information about a virtual image related to another real world object, the virtual image being rendered by another augmented reality device 100, from the server 200 providing the augmented reality service in operation S1530. For example, the aug-mented reality device 100 may receive information about a rendered virtual image corresponding to a digital item owned by another user.

The augmented reality device 100 may display the virtual image related to the other real world object on a display based on the received information about the virtual image related to the other real world object in operation S1540. For example, the augmented reality device 100 may display, at a matching location of the other real world object, a virtual image converted to fit the viewpoint of a user wearing the augmented reality device 100, by using the graphic infor-mation of the received rendered virtual image and the mapping location information of the other real world object.

The augmented reality device 100 may determine whether to terminate the augmented reality device 100 when trans-mission to the server 200 is completed, reception from the server 200 is completed, or there is no rendered virtual image to be transmitted or received in operation S1550.

The augmented reality device 100 may determine whether to add a virtual image corresponding to a digital item owned by the user of the augmented reality device 100 in operation S1560. When it is desired to add a virtual image correspond-ing to another digital item owned by the user of the aug-mented reality device 100, the augmented reality device 100 may proceed again from operation S210 of FIG. 2. On the other hand, when there are no more virtual images to be added, the augmented reality device 100 may proceed again from operation S1510.

Figure 16:
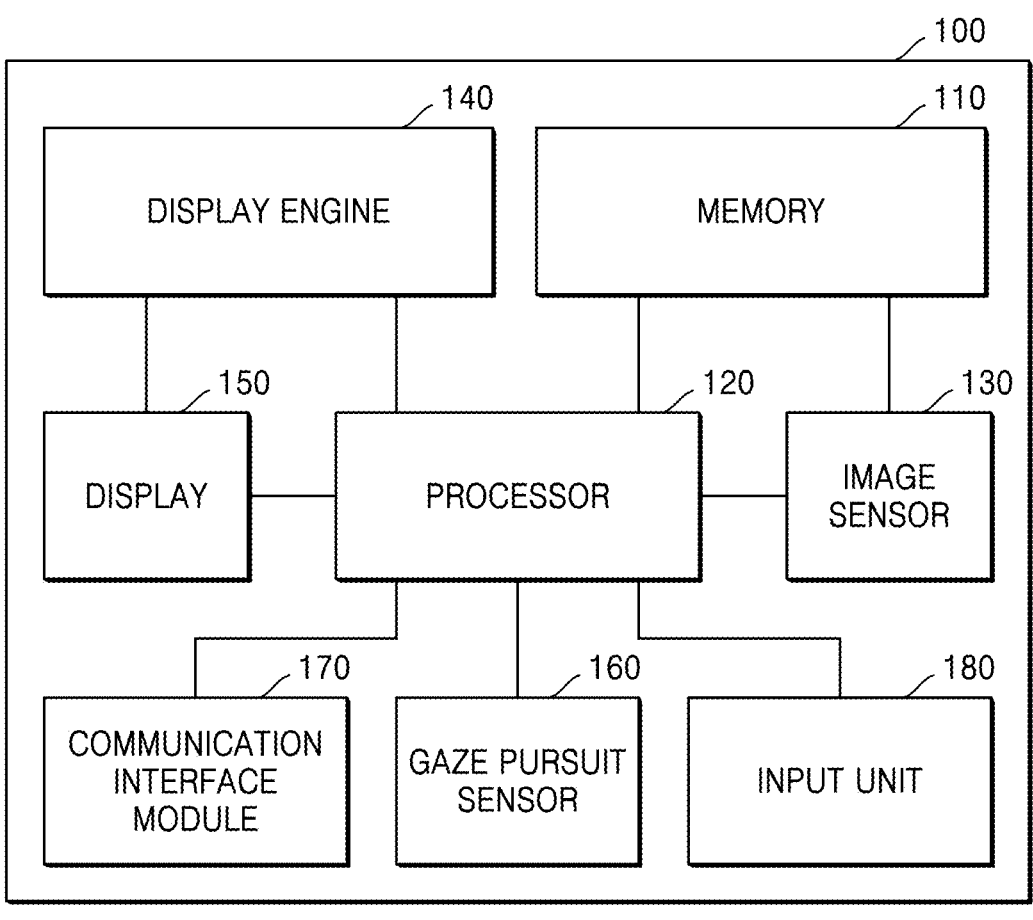
FIG. 16 is a block diagram illustrating a configuration of an augmented reality device according to an embodiment of the disclosure.

FIG. 16 is a block diagram illustrating a configuration of an augmented reality device according to an embodiment of the disclosure.

The above description of the method of providing a virtual image corresponding to a digital item may be apply to the augmented reality device 100 as is, even when the description is omitted below.

Referring to FIG. 16, the augmented reality device 100 may include memory 110, a processor 120, a camera 130, a display engine unit 140, a display 150, a gaze tracking sensor 160, a communication interface module 170, and an input unit 180. In addition, the augmented reality device 100 may further include elements, such as a position sensor for detecting the position of the augmented reality device 100 or a power supply unit for supplying power to the augmented reality device 100, and it will be understood by those of ordinary skill in the art that general element other than the elements shown in FIG. 16 may be further provided.

The memory 110 may store instructions executable by the processor 120. The memory 110 may store a program consisting of instructions. The memory 110 may include, for example, at least one type of hardware device of random access memory (RAM), static random access memory (SRAM), read-only memory (ROM), flash memory, electri-cally erasable programmable read-only memory (EE-PROM), programmable read-only memory (PROM), mag-netic memory, magnetic disk, or optical disk.

The memory 110 may store at least one software module including instructions. When each of the at least one soft-ware module is executed by the processor 120, the aug-mented reality device 100 may performs a certain operation or function. For example, a virtual image generation mod-ule, a mapping location determination module, a rendering module, or the like, may be executed by the processor 120, but the disclosure is not limited thereto and other software modules may be further provided.

The processor 120 may execute instructions stored in the memory 110 or a programmed software module to control an operation or a function performed by the augmented reality device 100. The processor 120 may include hardware ele-ments to perform an arithmetic operation, a logic operation, input/output operations, and signal processing.

The processor 120 may be configured as, but is not limited to, at least one of a central processing unit (CPU), a microprocessor, a graphics processing unit (GPU), an appli-cation-specific integrated circuits (ASIC), a digital signal processor (DSP), a digital signal processing device (DSPDs), a programmable logic device (PLD), a field-programmable gate array (FPGAs), an application proces-sor, a neural processing unit, or a dedicated artificial intel-ligence processor designed in a hardware structure specialized for processing an artificial intelligence model. Each processor constituting the processor 120 may be a dedicated processor for performing a certain function.

The camera 130 is a device that photographs a scene of the real world, and may be a stereo camera that obtains a stereo image or a single camera. The camera 130 may include a lens module including lenses, an auto focus (AF) actuator, an image sensor, and an image signal processor. The lens module may have a structure in which a plurality of lenses are arranged in a lens barrel and allow light incident from the outside to pass through the lenses. The AF actuator may move the lenses to an optimal focus position to obtain a clear image. The image signal processor may convert an electrical signal obtained through conversion by the image sensor into an image signal. In addition, the camera 130 may further include a depth camera for detecting depth information.

The augmented reality device 100 may include a plurality of cameras 130 corresponding to each function. For example, the plurality of cameras 130 may include a first camera for photographing a direction corresponding to a user's gaze information, a second camera for photographing a direction at a specific angle, a third camera for obtaining depth information, and a fourth camera for three-dimensionally scanning a real world object.

The augmented reality device 100 may render and display a virtual image through the display engine unit 140 and the display 150. The virtual image may be generated through an optical engine and may include both a static image and a dynamic image. The virtual image may be observed together with a real world scene (i.e., a real scene) viewed by a user through the augmented reality device 100, and may be an image of a real world object in the real scene or an image representing information about an operation of the augmented reality device 100, a control menu, or the like.

The display engine unit 140 may include an optical engine that generates and projects a virtual image, and a guide unit that guides light of the virtual image projected from the optical engine to the display 150. The display 150 may include a see-through waveguide embedded in the left-eye lens and/or the right-eye lens of the augmented reality device 100. The display 150 may display a virtual image mapped to a real world object or a virtual image representing information about an operation of the augmented reality device 100 or a control menu.

The display 150 may be implemented in a form including a plurality of depth layers. The display 150 may provide a user experience of viewing a virtual image integrated with a real world object in augmented reality by providing a virtual image to a depth layer corresponding to a real world object model.

When a virtual image is displayed through the display 150, a user wearing the augmented reality device 100 may manipulate the virtual image through the camera 130, the gaze tracking sensor 160, or the input unit 180 to manipulate the virtual image.

The gaze tracking sensor 160 may detect gaze information, such as a direction of the gaze of a user's eyes, the position of the pupil of the user's eyes, or the coordinates of a center point of the pupil. For example, the gaze tracking sensor 160 may detect the pupil from a captured image by irradiating infrared light to the user's eyes and receiving the reflected light, thereby tracking the movement thereof. The processor 120 may determine the form of eye movement based on the gaze information of the user detected by the gaze tracking sensor 160. For example, the processor 120 may determine various forms of gaze movement, including fixation that means gazing at a certain place, pursuit that means pursuing a moving object, and saccade that means quickly moving the gaze from one gaze point to another gaze point, based on the gaze information obtained from the gaze tracking sensor 160.

The processor 120 of the augmented reality device 100 may determine the user's gaze point or the user's gaze movement by using the gaze tracking sensor 160 and use a determination result to control the augmented reality device 100. The processor 120 may control the camera 130 according to the gaze point or the gaze movement determined by the gaze tracking sensor 160 and obtain at least one image.

The communication interface module 170 may be connected to a device located outside the augmented reality device 100 and may transmit information obtained or generated by the augmented reality device 100 to the device, or receive various types of information from the device. For example, the device located outside the augmented reality device 100 may be a server 200 or a user terminal (not shown). The communication interface module 170 may perform communication with another device or network. To this end, the communication interface module 170 may include a communication module that supports at least one of various communication methods. For example, the communication interface module 170 may include a communication module that performs short-range communication, such as wireless fidelity (Wi-Fi) or Bluetooth, various types of mobile communication, or ultra-wideband communication.

The input unit 180 may receive an input from a user of the augmented reality device 100. For example, the input unit 180 may be, but is not limited to, a touch screen, a microphone that receives the user's voice, or a motion sensor that detects the user's motion. According to an embodiment of the disclosure, the input unit 180 may be replaced by receiving a user's input using the camera 130 and the gaze tracking sensor 160. For example, the processor 120 may obtain gaze coordinates based on gaze information obtained using the gaze tracking sensor 160. The processor 120 may identify a real world object corresponding to the gaze coordinates based on an image captured by the camera 130 and recognize a gesture for calling up a virtual image to be mapped to the real world object.

According to the above configuration, the processor 120 according to an embodiment of the disclosure may control overall operations for the augmented reality device 100 to provide a virtual image corresponding to a digital item by executing one or more instructions stored in the memory 110.

According to an embodiment of the disclosure, the processor 120 or a first processor constituting the processor 120 may control the display engine unit 140 by executing a virtual image generation module and generate a virtual image corresponding to a digital item owned by a user of the augmented reality device 100.

According to an embodiment of the disclosure, the processor 120 or the first processor may control the display engine unit 140 and provide a list of digital items through the display 150. The processor 120 or the first processor may analyze the attributes of a digital item selected by the user from the list of digital items. The processor 120 or the first processor may control the display engine unit 140 and provide a prototype list of virtual images through the display 150 based on the analyzed attributes. For example, the processor 120 or the first processor may determine whether there is an image to be extracted from a digital item selected by the user. When there is an image to be extracted, the processor 120 or the first processor may extract an image from the selected digital item, and when there is no image to be extracted, the processor 120 or the first processor may generate an image based on the attributes of the selected digital item. The processor 120 or the first processor may control the display engine unit 140 and provide a prototype list of virtual images through the display 150 based on the extracted image or generated image. The processor 120 or the first processor may control the display engine unit 140 and generate a virtual image according to a prototype selected by the user from the prototype list. For example, the processor 120 or the first processor may determine whether the prototype selected by the user is in a 3D form. When the selected prototype is in a 3D form, the processor 120 or the first processor may control the display engine unit 140 and generate a 3D virtual image by using an augmented reality fitting library. When the selected prototype is not in a 3D form, the processor 120 or the first processor may control the display engine unit 140 and generate a 2D virtual image according to the selected prototype.

According to an embodiment of the disclosure, the processor 120 or a second processor constituting the processor 120 may obtain mapping location information of a real world object, to which a generated virtual image is to be mapped, by using the camera 130 and the gaze tracking sensor 160 by executing a mapping location determination module.

According to an embodiment of the disclosure, the processor 120 or the second processor may obtain a real world object model corresponding to a real world object by using the camera 130 and the gaze tracking sensor 160, and may obtain mapping location information of the real world object by placing a virtual image at a predetermined marker location corresponding to the obtained real world object model. According to an embodiment of the disclosure, the processor 120 or the second processor may scan a real world object by using the camera 130 and extract feature information from the scanned real world object. The processor 120 or the second processor may generate a real world object model based on the classification information and appearance information of the real world object based on the extracted feature information. The classification information of the real world object refers to information by which a recognized object is classified as a part of the user's body, an upper or lower garment, a shoe, or an item belonging to the user. The appearance information of the real world object refers to information, such as length, width, thickness, color, and material obtained by measuring the recognized object. The processor 120 or the second processor may generate a list of recognized objects based on the classification information and appearance information of the real world object and generate a real world object model corresponding to the real world object. The real world object model includes at least one marker that specifies a location within the real world object model. The augmented reality device 100 may obtain mapping location information of the real world object by placing a virtual image at a predetermined marker location according to a user's input.

According to an embodiment of the disclosure, the processor 120 or a third processor constituting the processor 120 may control the display engine unit 140 by executing a rendering module, thereby rendering a virtual image by mapping the virtual image based on the obtained mapping location information, and may display the rendered virtual image on the display 150 according to public setting information.

According to an embodiment of the disclosure, the processor 120 or the third processor may control the display engine unit 140 and adjust, according to the user's input, the virtual image placed based on the obtained mapping location information. When the real world object moves, the processor 120 or the third processor may control the display engine unit 140 and readjust the adjusted virtual image according to a change in the coordinates of the obtained mapping location information, thereby performing the rendering of the virtual image. According to an embodiment of the disclosure, the processor 120 or the third processor may display, on the display 150, a menu for receiving a user input for the public setting information and may obtain the public setting information according to the user input. The processor 120 or the third processor may display the rendered virtual image on the display 150 according to the obtained public setting information. The public setting information may include at least one of an item to be disclosed from among metadata items of a digital item corresponding to the rendered virtual image, a condition for disclosing the rendered virtual image, and an access right for the rendered virtual image.

According to an embodiment of the disclosure, the processor 120 or a fourth processor constituting the processor 120 may transmit information about the rendered virtual image to the server 200, which provides the augmented reality service, through the communication interface module 170 by executing one or more instructions. The information about the rendered virtual image may include graphic information of the virtual image and mapping location information of the real world object. The processor 120 or the fourth processor may receive information about a virtual image related to another real world object and rendered by another augmented reality device, from the server 200 providing the augmented reality service, through the communication interface module 170 by executing one or more instructions. The processor 120 or the fourth processor may display the virtual image related to the other real world object on the display 150 based on the received information about the virtual image related to the other real world object.

Figure 17:
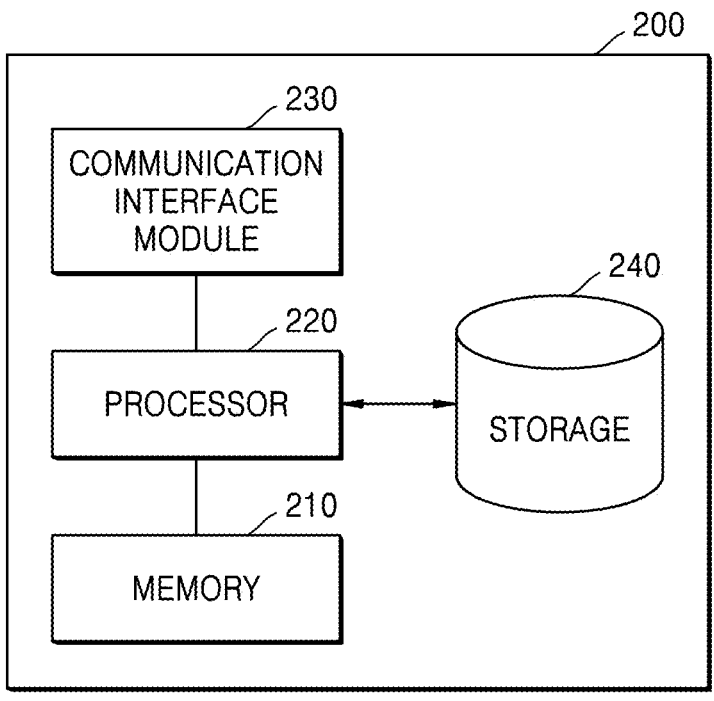
FIG. 17 is a block diagram illustrating a configuration of a server that provides an augmented reality service to an augmented reality device, according to an embodiment of the disclosure.

FIG. 17 is a block diagram illustrating a configuration of a server that provides an augmented reality service to an augmented reality device according to an embodiment of the disclosure.

Referring to FIG. 17, the server 200 includes memory 210, a processor 220, a communication interface module 230, and a storage 240. It will be understood by those of ordinary skill in the art that general elements other than the elements shown in FIG. 17 may be further provided.

Each element in the block diagram of FIG. 17 may be separated, added, or omitted depending on the implementation method of the server 200. For example, depending on the implementation method, one element may be subdivided into two or more elements, two or more elements may be combined into one element, or some elements may be further added or removed.

The memory 210 may store instructions executable by the processor 220. The memory 210 may store software or programs.

The processor 220 may execute instructions stored in the memory 210. The processor 220 may perform overall control of the server 200. The processor 220 may obtain information and requests received through the communication interface module 230 and store the received information in the storage 240. In addition, the processor 220 may process the received information. For example, the processor 220 may obtain information used in a second external device from information received from a first external device, or perform a function of processing the received information. In addition, the processor 220 may transmit information received from the first external device to the second external device.

The communication interface module 230 may perform communication with an external device, such as the augmented reality device 100. For example, the server 200 may receive information about a virtual image from the augmented reality device 100 and transmit the information about the virtual image to another augmented reality device 100.

The storage 240 may store various types of software and information. For example, the storage 240 may store various types of data or information used to provide programs, applications, and augmented reality services running on the server 200. The server 200 may function as an intermediary device to exchange information between augmented reality devices 100 within a predetermined range. To this end, the server 200 may pre-register information about an augmented reality device 100 for each user in the storage 240 and update information related to the augmented reality service. The server 200 may determine which augmented reality device 100 to transmit information about a virtual image received from the augmented reality device 100. The information about the virtual image includes graphic information of a rendered virtual image and mapping location information of a real world object.

Embodiments of the disclosure may be implemented as a recording medium including computer-executable instructions, such as a computer-executable program module. A computer-readable medium may be any available medium which is accessible by a computer, and may include a volatile or non-volatile medium and a detachable and non-detachable medium. In addition, the computer-readable medium may include a computer storage medium and a communication medium. The computer storage media include both volatile and non-volatile, detachable and non-detachable media implemented in any method or technique for storing information, such as computer readable instructions, data structures, program modules or other data. The communication medium may typically include computer-readable instructions, data structures, or other data of a modulated data signal, such as program modules.

In addition, the computer-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment of the disclosure, the method according to various embodiments disclosed herein may be included in a computer program product and then provided. The computer program product may be traded as commodities between sellers and buyers. The computer program product may be distributed in the form of a machine-readable storage medium (e.g., a compact disc (CD) ROM (CD-ROM), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium, such as a manufacturer's server, an application store's server, or memory of a relay, server.

According to an embodiment of the disclosure, a method of providing a virtual image corresponding to a digital item is provided. The method of providing the virtual image corresponding to the digital item includes generating the virtual image corresponding to the digital item owned by a user of an augmented reality device in operation S210. In addition, the method of providing the virtual image corresponding to the digital item includes obtaining mapping location information of a real world object to which the generated virtual image is to be mapped in operation S220. In addition, the method of providing the virtual image corresponding to the digital item includes mapping and rendering the virtual image based on the obtained mapping location information in operation S230. In addition, the method of providing the virtual image corresponding to the digital item includes displaying the rendered virtual image on a display of the augmented reality device according to public setting information in operation S240.

In addition, according to an embodiment of the disclosure, the generating (in operation S210) of the virtual image includes providing a list of the digital items in operation S310. In addition, the generating (in operation S210) of the virtual image includes analyzing attributes of a digital item selected by the user in operation S320. In addition, the generating (in operation S210) of the virtual image includes providing a prototype list of the virtual image based on the analyzed attributes in operation S330. In addition, the generating (in operation S210) of the virtual image includes generating the virtual image according to a prototype selected by the user in operation S340.

In addition, the providing (in operation S330) of the prototype list includes determining whether there is an image to be extracted from the selected digital item in operation S410. In addition, the providing (in operation S330) of the prototype list includes extracting an image from the selected digital item when there is an image to be extracted in operation S420, and generating an image based on the attributes of the selected digital item when there is no image to be extracted in operation S430. In addition, the providing (in operation S330) of the prototype list includes providing the prototype list of the virtual image based on the extracted image or the generated image in operation S440.

In addition, the generating (in operation S340) of the virtual image includes determining whether the prototype selected by the user is in a three-dimensional form in operation S710. In addition, the generating (in operation S340) of the virtual image includes generating a three-dimensional virtual image by using an augmented reality fitting library when the selected prototype is in the three-dimensional form in operation S720 and S730, and generating a two-dimensional virtual image according to the selected prototype when the selected prototype is not in the three-dimensional form in operation S740.

In addition, according to an embodiment of the disclosure, the obtaining (in operation S220) of the mapping location information includes obtaining a real world object model corresponding to the real world object in operation S910. In addition, the obtaining (in operation S220) of the mapping location information includes placing the virtual image at a predetermined marker location corresponding to the obtained real world object model in operation S920.

In addition, according to an embodiment of the disclosure, the mapping and rendering (in operation S230) of the virtual image includes adjusting, according to the user's input, the virtual image placed based on the obtained mapping location information in operation S1110. In addition, the mapping and rendering (in operation S230) of the virtual image includes readjusting the adjusted virtual image according to a change in coordinates of the obtained mapping location information in operation S1120.

In addition, according to an embodiment of the disclosure, the displaying (in operation S240) of the rendered virtual image according to the public setting information includes displaying a menu for receiving a user input for the public setting information S1310. In addition, the displaying (in operation S240) of the rendered virtual image according to the public setting information includes obtaining the public setting information according to the user input in operation S1320. In addition, the displaying (in operation S240) of the rendered virtual image according to the public setting information includes displaying the rendered virtual image according to the obtained public setting information in operation S1330. In this case, the public setting information includes at least one of an item to be disclosed from among metadata items of the digital item corresponding to the rendered virtual image, a condition for disclosing the rendered virtual image, and an access right for the rendered virtual image.

In addition, according to an embodiment of the disclosure, the method of providing the virtual image corresponding to the digital item further includes transmitting information about the rendered virtual image to a server providing an augmented reality service in operation S1520. In this case, the information about the rendered virtual image includes graphic information of the virtual image and mapping location information of the real world object.

In addition, according to an embodiment of the disclosure, the method of providing the virtual image corresponding to the digital item further includes receiving in operation S1530, from the server providing the augmented reality service, information about a virtual image related to another real world object and rendered by another augmented reality device. In addition, the method of providing the virtual image corresponding to the digital item further includes displaying the virtual image related to the other real world object on the display based on the received information about the virtual image related to the other real world object in operation S1540.

According to an embodiment of the disclosure, a computer-readable recording medium having recorded thereon a program for executing the method described above may be provided.

According to an embodiment of the disclosure, an augmented reality device 100 providing a virtual image corresponding to a digital item is provided. The augmented reality device 100 providing a virtual image corresponding to a digital item includes memory 110 storing one or more instructions, a processor 120, a camera 130, a display engine unit 140, a display 150, and a gaze tracking sensor 160. The processor 120 is configured to, by executing the one or more instructions, control the display engine unit 140 to generate a virtual image corresponding to a digital item owned by a user of the augmented reality device 100. In addition, the processor 120 is configured to, by executing the one or more instructions, obtain mapping location information of a real world object, to which the generated virtual image is to be mapped, by using the camera 130 and the gaze tracking sensor 160. In addition, the processor 120 is configured to, by executing the one or more instructions, map and render the virtual image based on the obtained mapping location information by controlling the display engine unit 140. In addition, the processor 120 is configured to, by executing the one or more instructions, display the rendered virtual image on the display 150 according to public setting information.

In addition, according to an embodiment of the disclosure, the processor 120 is further configured to, by executing the one or more instructions, control the display engine unit 140 and provide a list of the digital items through the display 150. In addition, the processor 120 is further configured to, by executing the one or more instructions, analyze attributes of a digital item selected by the user. In addition, the processor 120 is further configured to, by executing the one or more instructions, control the display engine unit 140 and provide a prototype list of the virtual image through the display 150 based on the analyzed attributes. In addition, the processor 120 is further configured to, by executing the one or more instructions, control the display engine unit 140 and generate the virtual image according to the a prototype selected by the user.

In addition, the processor 120 is further configured to, by executing the one or more instructions, determine whether there is an image to be extracted from the selected digital item, extract an image from the selected digital item when there is an image to be extracted, and generate an image based on the attributes of the selected digital item when there is no image to be extracted. In addition, the processor 120 is further configured to, by executing the one or more instructions, control the display engine unit 140 and provide a prototype list of the virtual image through the display 150 based on the extracted image or generated image.

In addition, the processor 120 is further configured to, by executing the one or more instructions, determine whether the prototype selected by the user is in a three-dimensional form. In addition, the processor 120 is further configured to, by executing the one or more instructions, control the display engine unit 140, generate a three-dimensional virtual image by using an augmented reality fitting library when the selected prototype is in the three-dimensional form, and generate a two-dimensional virtual image according to the selected prototype when the selected prototype is not in the three-dimensional form.

In addition, the processor 120 is further configured to, by executing the one or more instructions, obtain a real world object model corresponding to the real world object by using the camera 130 and the gaze tracking sensor 160 and obtain mapping location information of the real world object by placing a virtual image at a predetermined marker location corresponding to the obtained real world object model.

In addition, the processor 120 is further configured to, by executing the one or more instructions, scan the real world object by using the camera 130. In addition, the processor 120 is further configured to, by executing the one or more instructions, extract feature information from the scanned real world object, and generate a real world object model according to the classification information and appearance information of the real world object based on the extracted feature information.

In addition, according to an embodiment of the disclosure, the processor 120 is further configured to, by executing the one or more instructions, control the display engine unit 140, adjust the placed virtual image according to the user's input based on the obtained mapping location information, and perform rendering of the virtual image by readjusting the adjusted virtual image according to a change in the coordinates of the obtained mapping location information.

In addition, according to an embodiment of the disclosure, the processor 120 is further configured to, by executing the one or more instructions, display, on the display 150, a menu for receiving a user input for the public setting information, obtain the public setting information according to the user input, and display the rendered virtual image on the display 150 according to the obtained public setting information. In this case, the public setting information includes at least one of an item to be disclosed from among metadata items of the digital item corresponding to the rendered virtual image, a condition for disclosing the rendered virtual image, and an access right for the rendered virtual image.

In addition, according to an embodiment of the disclosure, the augmented reality device 100 providing a virtual image corresponding to a digital item further includes a communication interface module 170. In addition, the processor 120 is further configured to, by executing the one or more instructions, transmit information about the rendered virtual image to the server 200, which provides an augmented reality service, through the communication interface module 170. In this case, the information about the rendered virtual image includes graphic information of the virtual image and mapping location information of the real world object.

In addition, according to an embodiment of the disclosure, the augmented reality device 100 providing a virtual image corresponding to a digital item further includes the communication interface module 170. In addition, the processor 120 is further configured to, by executing the one or more instructions, receive information about a virtual image related to another real world object and rendered by another augmented reality device, from the server 200 providing the augmented reality service, through the communication interface module 170. In addition, the processor 120 is further configured to, by executing the one or more instructions, display the virtual image related to the other real world object on the display 150 based on the received information about the virtual image related to the other real world object.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

Each element described in a single type may be executed in a distributed manner, and elements described distributed may also be executed in an integrated form.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of providing a virtual image corresponding to a digital item, the method comprising:

generating the virtual image corresponding to the digital item owned by a user of an augmented reality device, the generating comprising:

determining whether an image is extractable from the digital item by confirming the presence of a graphic information in the digital item;

based on a determination that the image is extractable from the digital item, extracting the image from the digital item for use as the virtual image; and based on a determination that no image is extractable from the digital item, generating an image in two dimensions (2D) or three dimensions (3D) based on metadata including a title or a file format of the digital item for use as the virtual image;

obtaining mapping location information of a real world object to which the generated virtual image is to be mapped;

mapping and rendering the virtual image based on the obtained mapping location information; and displaying the rendered virtual image on a display of the augmented reality device according to public setting information.

2. The method of claim 1, wherein the generating of the image based on attributes of the digital item for the virtual image comprises:

providing a list of digital items;

analyzing attributes of a digital item selected by the user;

providing a prototype list of the virtual image based on the analyzed attributes; and generating the virtual image according to a prototype selected by the user.

3. The method of claim 2, wherein the providing of the prototype list comprises:

determining whether there is an image to be extracted from the selected digital item;

based on an image being extractable from the selected digital item, extracting the image from the selected digital item, and based on no image being extractable from the selected digital item, generating an image based on the attributes of the selected digital item; and providing the prototype list of the virtual image based on the extracted image or the generated image.

4. The method of claim 3, wherein the generating of the virtual image according to the prototype selected by the user comprises:

determining whether the prototype selected by the user is in a three-dimensional form; and based on the selected prototype being in the three-dimensional form, generating a three-dimensional virtual image by using an augmented reality fitting library, and based on the selected prototype not being in the three-dimensional form, generating a two-dimensional virtual image according to the selected prototype.

5. The method of claim 1, wherein the obtaining of the mapping location information comprises:

obtaining a real world object model corresponding to the real world object; and placing the virtual image at a predetermined marker location corresponding to the obtained real world object model.

6. The method of claim 1, wherein the mapping and rendering of the virtual image comprises:

adjusting, according to the user's input, the virtual image placed based on the obtained mapping location information; and readjusting the adjusted virtual image according to a change in coordinates of the obtained mapping location information.

7. The method of claim 1, wherein the displaying of the rendered virtual image according to the public setting information comprises:

displaying a menu for receiving a user input for the public setting information;

obtaining the public setting information according to the user input; and displaying the rendered virtual image according to the obtained public setting information, wherein the public setting information comprises at least one of an item to be disclosed from among metadata items of the digital item corresponding to the rendered virtual image, a condition for disclosing the rendered virtual image, or an access right for the rendered virtual image.

8. The method of claim 1, further comprising transmitting information about the rendered virtual image to a server providing an augmented reality service, wherein the information about the rendered virtual image comprises graphic information of the virtual image and mapping location information of the real world object.

9. The method of claim 8, further comprising:

receiving, from the server providing the augmented reality service, information about a virtual image related to another real world object and rendered by another augmented reality device; and displaying the virtual image related to the other real world object on the display based on the received information about the virtual image related to the other real world object.

10. The method of claim 1, wherein the digital item is a digital asset selected from a product being purchased or traded on a virtual world platform, user-generated content (UGC), and a non-fungible token (NFT).

11. One or more non-transitory computer-readable storage media storing computer-executable instructions that, when executed by one or more processors individually or collectively, cause an augmented reality device to perform operations of providing a virtual image corresponding to a digital item, the operations comprising:

generating the virtual image corresponding to the digital item owned by a user of an augmented reality device, the generating of the virtual image comprising:

determining whether an image is extractable from the digital item by confirming the presence of a graphic information in the digital item;

based on a determination that the image is extractable from the digital item, extracting the image from the digital item for use as the virtual image; and based on a determination that no image is extractable from the digital item, generating an image in two dimensions (2D) or three dimensions (3D) based on metadata including a title or a file format of the digital item for use as the virtual image;

obtaining mapping location information of a real world object to which the generated virtual image is to be mapped;

mapping and rendering the virtual image based on the obtained mapping location information; and displaying the rendered virtual image on a display of the augmented reality device according to public setting information.

12. The one or more non-transitory computer-readable storage media of claim 11, wherein the generating of the image based on attributes of the digital item for the virtual image comprises:

providing a list of digital items;

analyzing attributes of a digital item selected by the user;

providing a prototype list of the virtual image based on the analyzed attributes; and generating the virtual image according to a prototype selected by the user.

13. An augmented reality device providing a virtual image corresponding to a digital item, the augmented reality device comprising:

memory storing one or more computer programs;

a camera;

a display engine;

a display;

a gaze tracking sensor; and one or more processors communicatively coupled to the camera, the display engine, the display, and the gaze tracking sensor, wherein the one or more computer programs include computer-executable instructions that, when executed by the one or more processors individually or collectively, cause the augmented reality device to:

control the display engine to generate a virtual image corresponding to a digital item owned by a user of the augmented reality device, the generation being operations comprising:

determining whether an image is extractable from the digital item by confirming the presence of a graphic information in the digital item;

based on a determination that the image is extractable from the digital item, extracting the image from the digital item for use as the virtual image; and based on a determination that no image is extractable from the digital item, generating an image in two dimensions (2D) or three dimensions (3D) based on metadata including a title or a file format of the digital item for use as the virtual image, obtain mapping location information of a real world object, to which the generated virtual image is to be mapped, by using the camera and the gaze tracking sensor, map and render the virtual image based on the obtained mapping location information by controlling the display engine, and display the rendered virtual image on the display according to public setting information.

14. The augmented reality device of claim 13, wherein the one or more computer programs further include computer-executable instructions that, when executed by the one or more processors individually or collectively, cause the augmented reality device to:

control the display engine to provide a list of digital items through the display, analyze attributes of a digital item selected by the user, control the display engine and provide a prototype list of the virtual image through the display based on the analyzed attributes, and control the display engine and generate the virtual image according to a prototype selected by the user.

15. The augmented reality device of claim 14, wherein the one or more computer programs further include computer-executable instructions that, when executed by the one or more processors individually or collectively, cause the augmented reality device to:

determine whether there is an image to be extracted from the selected digital item, based on an image being extractable from the selected digital item, extract the image from the selected digital item, and based on no image being extractable from the selected digital item, generate an image based on the attributes of the selected digital item, and provide the prototype list of the virtual image based on the extracted image or the generated image.

16. The augmented reality device of claim 15, wherein the one or more computer programs further include computer-executable instructions that, when executed by the one or more processors individually or collectively, cause the augmented reality device to:

determine whether the prototype selected by the user is in a three-dimensional form, and based on the selected prototype being in the three-dimensional form, generate a three-dimensional virtual image by using an augmented reality fitting library, and based on the selected prototype not being in the three-dimensional form, generate a two-dimensional virtual image according to the selected prototype.

17. The augmented reality device of claim 13, wherein the one or more computer programs further include computer-executable instructions that, when executed by the one or more processors individually or collectively, cause the augmented reality device to:

obtain a real world object model corresponding to the real world object by using the camera and the gaze tracking sensor, and place the virtual image at a predetermined marker location corresponding to the obtained real world object model, thereby obtaining mapping location information of the real world object.

18. The augmented reality device of claim 17, wherein the one or more computer programs further include computer-executable instructions that, when executed by the one or more processors individually or collectively, cause the augmented reality device to:

control the display engine to adjust the placed virtual image according to the user's input based on the obtained mapping location information; and perform rendering of the virtual image by readjusting the adjusted virtual image according to a change in coordinates of the obtained mapping location information.

19. The augmented reality device of claim 18, wherein the one or more computer programs further include computer-executable instructions that, when executed by the one or more processors individually or collectively, cause the augmented reality device to:

by executing the one or more instructions, display, on the display, a menu for receiving a user input for the public setting information, obtain the public setting information according to the user input, and display the rendered virtual image on the display according to the obtained public setting information, and wherein the public setting information comprises at least one of an item to be disclosed from among metadata items of the digital item corresponding to the rendered virtual image, a condition for disclosing the rendered virtual image, or an access right for the rendered virtual image.

20. The augmented reality device of claim 13, wherein the one or more computer programs further include computer-executable instructions that, when executed by the one or more processors individually or collectively, cause the augmented reality device to:

transmit information about the rendered virtual image to a server providing an augmented reality service, wherein the information about the rendered virtual image comprises graphic information of the virtual image and mapping location information of the real world object.

21. The augmented reality device of claim 20, wherein the one or more computer programs further include computer-executable instructions that, when executed by the one or more processors individually or collectively, cause the augmented reality device to:

receive, from the server providing the augmented reality service, information about a virtual image related to another real world object and rendered by another augmented reality device, and display the virtual image related to the other real world object on the display based on the received information about the virtual image related to the other real world object.

\* \* \* \* \*